United States Patent
Kato et al.

(10) Patent No.: US 12,547,138 B2
(45) Date of Patent: Feb. 10, 2026

(54) DEVICE MANAGEMENT SYSTEM

(71) Applicant: Mitsubishi Electric Corporation, Tokyo (JP)

(72) Inventors: Shun Kato, Tokyo (JP); Hirotoshi Yano, Tokyo (JP); Masanori Nakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 370 days.

(21) Appl. No.: 18/251,148

(22) PCT Filed: Dec. 10, 2020

(86) PCT No.: PCT/JP2020/045987
§ 371 (c)(1),
(2) Date: Apr. 28, 2023

(87) PCT Pub. No.: WO2022/123717
PCT Pub. Date: Jun. 16, 2022

(65) Prior Publication Data
US 2023/0375996 A1  Nov. 23, 2023

(51) Int. Cl.
*G05B 19/042* (2006.01)

(52) U.S. Cl.
CPC .. *G05B 19/042* (2013.01); *G05B 2219/25011* (2013.01)

(58) Field of Classification Search
None
See application file for complete search history.

(56) References Cited

U.S. PATENT DOCUMENTS 8,099,251 B2 *  1/2012  Schipper ................. G06F 30/00
                                              702/108
8,418,211 B2 *  4/2013  Beals ...................... H04N 5/44
                                              725/80

(Continued)

FOREIGN PATENT DOCUMENTS

WO      2019/168032 A1      9/2019

OTHER PUBLICATIONS

International Search Report of the International Searching Authority mailed Feb. 16, 2021 in corresponding International Patent Application No. PCT/JP2020/045987 (with English translation).

*Primary Examiner* — Jason Lin
(74) *Attorney, Agent, or Firm* — Posz Law Group, PLC

(57) ABSTRACT

A device management system includes: an air-conditioning apparatus and a server with a storage, a controller. The storage stores a first identifier unique to the air-conditioning apparatus and a second identifier different from the first identifier and uniquely identifying the air-conditioning apparatus in communication with the server. The controller receives the second identifier and a third identifier changed from the first identifier when the air-conditioning apparatus configuration is changed. The controller detects a change from the first identifier to a third identifier when the second identifier matches the second identifier stored in the storage. The controller converts the third identifier to the first identifier. The server controls operation of the air-conditioning apparatus that sent the third identifier as a replacement or repair of the air-conditioning apparatus.

15 Claims, 18 Drawing Sheets

(56) References Cited

U.S. PATENT DOCUMENTS

| | | | |
|---|---|---|---|
| 8,525,651 B2* | 9/2013 | Hale | H04N 21/42204 340/12.51 |
| 8,941,784 B2* | 1/2015 | Hale | H04N 21/41265 725/139 |
| 8,983,387 B1* | 3/2015 | Maclean | H04M 1/72415 455/41.3 |
| 9,070,280 B2* | 6/2015 | Baker | G08C 17/02 |
| 9,210,357 B1* | 12/2015 | Dong | G08C 23/04 |
| 9,560,407 B2* | 1/2017 | Noble | H04N 21/42204 |
| 9,721,466 B2* | 8/2017 | Sallas | G08C 17/02 |
| 10,142,668 B1* | 11/2018 | Nijim | H04N 21/41407 |
| 10,404,801 B2* | 9/2019 | Martch | H04W 4/80 |
| 2005/0209738 A1* | 9/2005 | Kwon | G05B 19/042 700/277 |
| 2007/0080823 A1* | 4/2007 | Fu | G08C 23/04 340/4.3 |
| 2010/0103930 A1* | 4/2010 | Lin | H04L 45/302 370/389 |
| 2015/0100674 A1* | 4/2015 | Chiche | G05B 19/0426 709/222 |
| 2021/0014314 A1 | 1/2021 | Yamada et al. | |
| 2021/0203726 A1 | 7/2021 | Yamada et al. | |
| 2021/0282017 A1* | 9/2021 | Balarajashetty | G08C 23/04 |
| 2023/0232215 A1* | 7/2023 | Kou | H04W 8/26 370/328 |

\* cited by examiner

DEVICE MANAGEMENT SYSTEM

CROSS-REFERENCE TO RELATED APPLICATION

This application is a U.S. national stage application of PCT/JP2020/045987 filed on Dec. 10, 2020, the contents of which are incorporated herein by reference.

TECHNICAL FIELD

The present disclosure relates to a device management system that conducts individual management of devices.

BACKGROUND ART

A device management system of related art is disclosed in which a server distinguishes a state of a device based on unique information of a base station that is a communication destination of the device together with operation information of the device (see, for example, Patent Literature 1).

CITATION LIST

Patent Literature

Patent Literature 1: WO2019/168032A

SUMMARY OF INVENTION

Technical Problem

In the device management system of the related art, where a device is repaired or replaced and changed, the device management system recognizes the device repaired or replaced as a different device, problematically.

The device management system of the present disclosure is created in view of the above, and one object thereof is to provide a device management system that can conduct device management consistently as a same device even when the device is repaired or replaced.

Solution to Problem

A device management system according to one embodiment of the present disclosure includes: a device being a management target; and a device management apparatus configured to manage the device, the device including a device-side sending and receiving unit configured to communicate with the device management apparatus, the device management apparatus including a storage unit configured to store a first identifier unique to the device and a second identifier identifying the device in communication between the device and the device management apparatus; a sending and receiving unit configured to receive, when the configuration of the device is changed, a third identifier allocated by being changed from the first identifier and the second identifier from the device-side sending and receiving unit, a first identifier change detection unit configured to detect change of the first identifier when the third identifier received by the sending and receiving unit is different from the first identifier stored in the storage unit, and the second identifier received from the sending and receiving unit matches the second identifier stored in the storage unit, an identifier converting unit configured to, when the change of the first identifier is detected by the first identifier change detection unit, convert the third identifier received by the sending and receiving unit to the first identifier, and output the converted first identifier and the second identifier, and a device management unit configured to manage the device that sent the third identifier and the second identifier as the device that includes the first identifier and the second identifier output from the identifier converting unit.

Advantageous Effects of Invention

According to one embodiment of the present disclosure, the device management unit manages the device that sent a third identifier and a second identifier as a device that includes the first identifier and the second identifier output from the identifier converting unit. With this configuration, the device management system can conduct device management of a device consistently as a same device as before repair or replacement even when configuration of the device is changed and the first identifier is changed.

DESCRIPTION OF EMBODIMENTS

Figure 1:
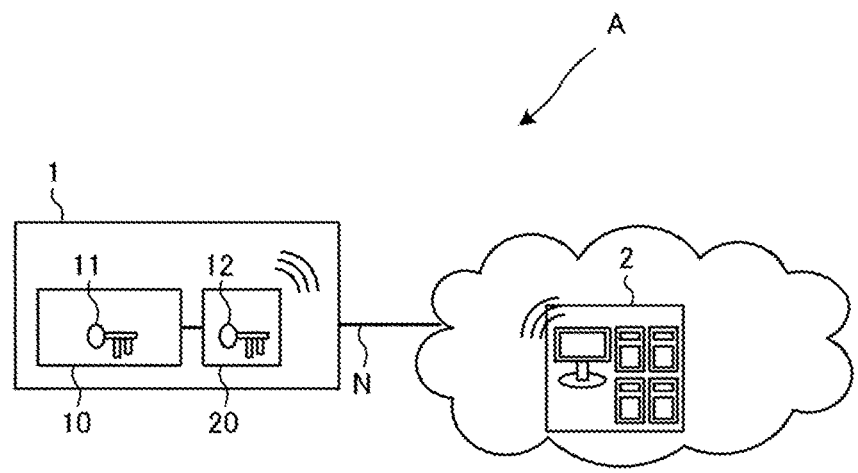
FIG. 1 is a diagram to describe a device management system according to Embodiment 1.

Hereafter, with reference to the drawings, the device management system according to embodiments will be described. In the drawings, same reference signs are applied to the same elements, and any overlapping description is omitted unless necessary. The present disclosure may include any combination of the configurations that can be combined of the configurations described in the embodiments.

Embodiment 1

FIG. 1 is a diagram for describing the device management system A in Embodiment 1.

As shown in FIG. 1, the device management system A includes a device 1 and a cloud server 2 that is a device management apparatus. The device 1 and the cloud server 2 are connect wiredly/wirelessly via a network N, and conducts communication.

The device 1 includes a control board 10 and a communication board 20. The control board 10 stores a first identifier 11. In the communication board 20, a second identifier 12 is stored. The device 1 is, for example, an air-conditioning apparatus.

The first identifier 11 is a unique identifier of the device 1 that is a management target. The first identifier 11 is preferably any of, but is not limited to, the type name of the device 1, a manufacturer's serial number, an identification number of a manufacturing line.

The second identifier 12 is an identifier for identifying the device 1 in the communication with device 1. Preferably, the second identifier 12 may be any of, but not limited to, Media Access Control (MAC) address, Universal Unique Identifier (UUID), International Mobile Identifier (IMEI) and Internet Protocol (IP) address.

<Configuration of Device 1>

Figure 2:
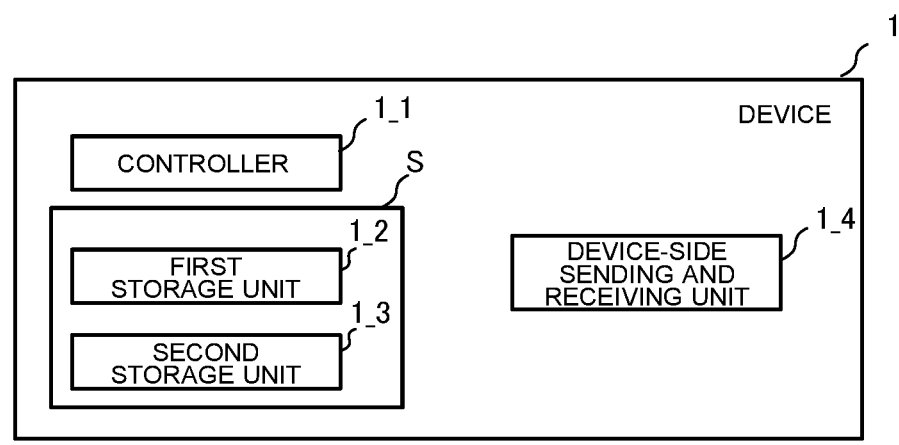
FIG. 2 is a functional block diagram of the devices of the device management system according to Embodiment 1.

FIG. 2 is a functional block diagram of the device 1 of the device management system A in Embodiment 1.

As shown in FIG. 2, the device 1 includes a controller 1_1, a storage unit S and a device-side sending and receiving unit 1_4. The storage unit S includes a first storage unit 1_2 and second storage unit 1_3.

The controller 1_1, in addition to conducting device management process of device 1 in Embodiment 1, governs overall control of device 1. The controller 1_1 is provided to the device 1 wherever possible of the device 1. For example, the controller 1_1 may be provided at the control board 10 or the communication board 20. The controller 1_1 may be provided to both of the control board 10 and the communication board 20. The controller 1_1 may be provided to other than the control board 10 and the communication board 20.

The controller 1_1 comprises dedicated hardware, or a Central Processing Unit (CPU, also called a central processor, a processor, an arithmetic unit, or a microprocessor, microcomputer, and processor) configured to execute a program stored in a memory. Where the controller 1_1 is dedicated hardware, the controller 1_1 may be, for example, a monolithic circuit, a composite circuit, an Application Specific Integrated Circuit (ASIC), a Field Programmable Gate Array (FPGA), or combinations thereof. Each of the functional unit realized by the controller 1_1 may be configured by different hardware, or a same hardware. Where the controller 1_1 is a CPU, each function executed by the controller 1_1 may be software, firmware, or a combination of software and firmware. The software and the firmware are written as programs, and stored in the memory. The CPU loads and executes the program stored in the memory to achieve each function of the controller 1_1. Here, the memory may be, volatile or non-volatile semiconductor memory, for example, a RAM, a ROM, a flash memory, an EPROM, EEPROM. A part of the function of the controller 1_1 may be achieved by dedicated hardware, while other parts may be achieved by software or firmware.

The first storage unit 1_2 is provided at the control board 10. The first storage unit 1_2 stores a first identifier 11. The second storage unit 1_3 is provided at the communication board 20. The second storage unit 1_3 stores the second identifier 12.

Preferably, the first identifier 11 is recorded in the control board 10, but the configuration is not limited to recording in the control board 10. Preferably, the second identifier 12 is recorded in the communication board 20, but the configuration is not limited to recording in the communication board 20. Moreover, the control board 10 and the communication board 20 may be a same board.

The device-side sending and receiving unit 1_4 sends a first identifier 11 stored in the first storage unit 1_2 and second identifier 12 stored in the second storage unit 1_3. The device-side sending and receiving unit 1_4, when the first identifier 11 stored in the first storage unit 1_2 is changed into the third identifier 13, sends the third identifier 13 and the second identifier 12. The device-side sending and receiving unit 1_4, when the second identifier 12 stored in the second storage unit 1_3 is changed into the fourth identifier 14, sends the first identifier 11 and fourth identifier 14.

The third identifier 13 is an identifier allocated to the device 1 by being changed from the first identifier 11, when the configuration of device 1 is changed due to failure, repair or replacement. The fourth identifier 14 is an identifier allocated to the device 1 whose identifier is changed from the second identifier 12 in the communication between the device 1 and the cloud server 2.

<Hardware Configuration of Cloud Server 2>

Figure 3:
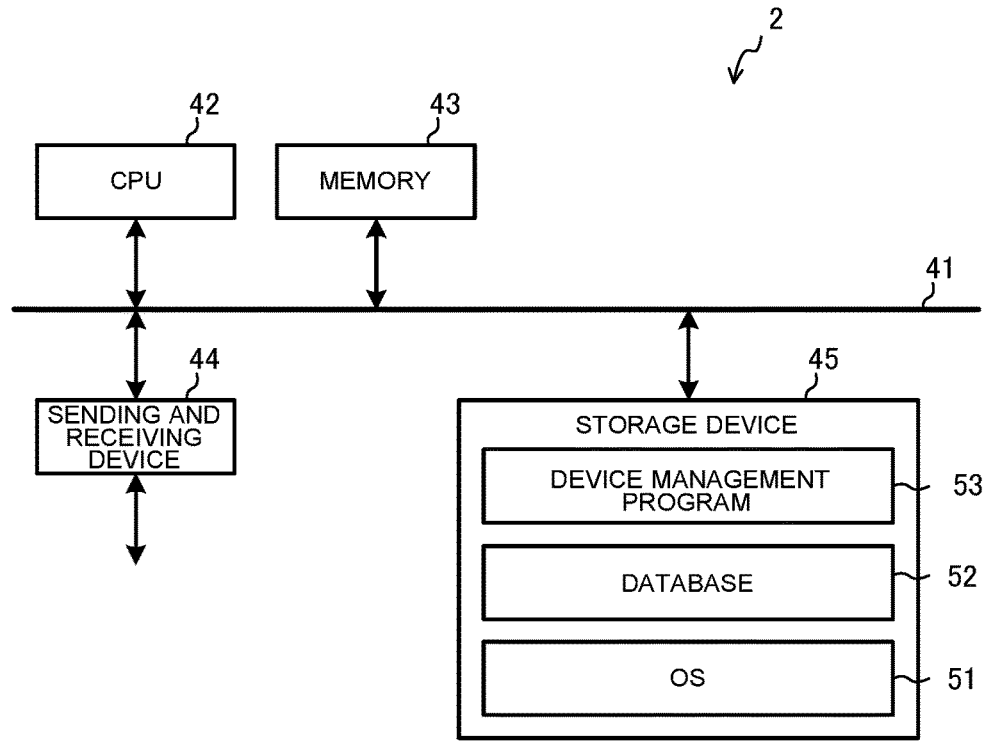
FIG. 3 shows hardware configuration of a cloud server of the device management system according to Embodiment 1.

FIG. 3 shows a hardware configuration of the cloud server 2 of the device management system A in Embodiment 1.

As shown in FIG. 3, the cloud server 2 includes a CPU 42 connected to the bus 41, a memory 43, a sending and receiving device 44 and a storage device 45. The cloud server 2 may include 2 or more servers.

The CPU 42 cooperates with a device management program 53 in Embodiment 1 stored in the storage device 45 to conduct a device management process in Embodiment 1, and the overall control of the cloud server 2.

The memory 43 is used as a work area or other area necessary in executing the device management process in Embodiment 1.

The sending and receiving device 44 governs communication of cloud server 2 performed via network N with device 1 external to the cloud server 2.

The storage device 45 stores an Operating System (OS) 51 and a device management program 53 configured to perform the device management process related to a database 52 in Embodiment 1. The storage device 45 is, for example, a large capacity HDD.

The OS 51 is a program configured to achieve basic functions of the cloud server 2.

The database 52 stores data used in the device management process performed by the device management program 53.

The device management program 53 is a program that governs the device management process in Embodiment 1.

<Functional Block Diagram of Cloud Server 2>

Figure 4:
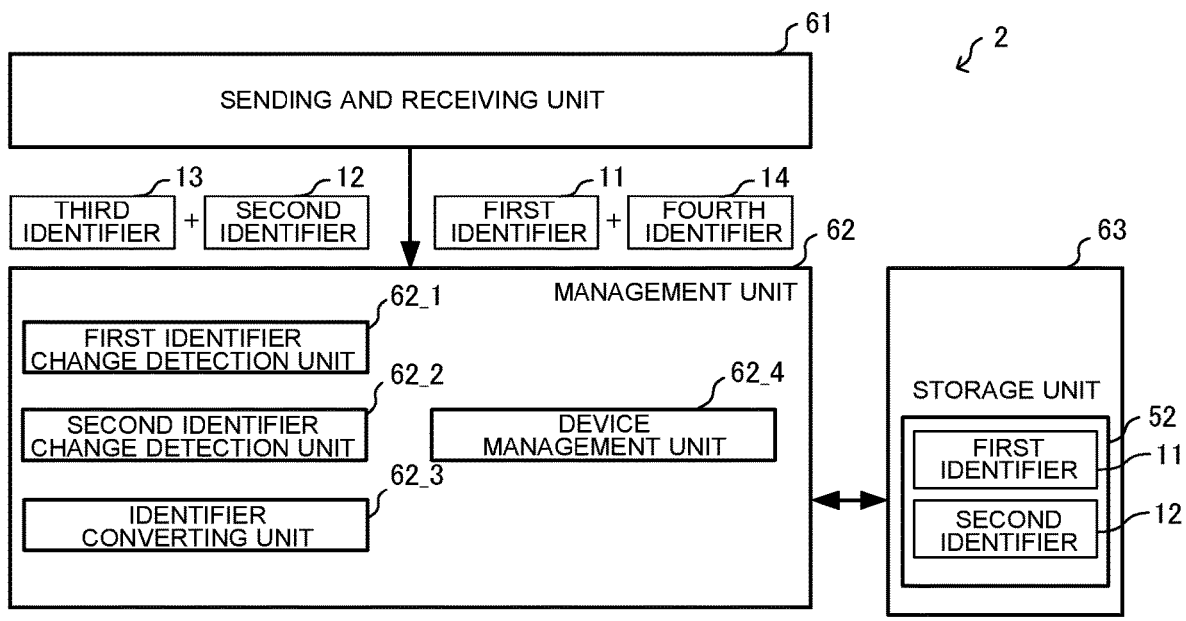
FIG. 4 is a functional block diagram of the cloud server of the device management system according to Embodiment 1.

FIG. 4 is a functional block diagram of the cloud server 2 of the device management system A in Embodiment 1.

In FIG. 4, the function of the sending and receiving unit 61 corresponds to the sending and receiving device 44. The function of the management unit 62 corresponds to the CPU 42. The function of the storage unit 63 corresponds to the storage device 45.

The storage unit 63 stores the first identifier 11 unique to the device 1 being the management target, and the second identifier 12 for identifying the device 1 in communication between the device 1 and the cloud server 2 in the database 52. The first identifier 11 and second identifier 12 stored in the storage unit 63 are identifiers before the change of the first identifier 11 or second identifier 12 of the device 1.

The sending and receiving unit 61 receives the third identifier 13 and fourth identifier 14 from the device 1.

The management unit 62 includes a first identifier change detection unit 62_1, a second identifier change detection unit 62_2, an identifier converting unit 62_3 and a device management unit 62_4.

The first identifier change detection unit 62_1 detects that the third identifier 13 receive by the sending and receiving unit 61 is different from the first identifier 11 stored in the storage unit 63. Specifically, the first identifier change detection unit 62_1 detects that the third identifier 13 received by the sending and receiving unit 61 is different from the first identifier 11 stored in the storage unit 63, and detect that the second identifier 12 received by the sending and receiving unit 61 matches the second identifier 12 stored in the storage unit 63.

The second identifier change detection unit 62_2 detects that the fourth identifier 14 received by the sending and receiving unit 61 is different from the second identifier 12 stored in the storage unit 63. Specifically, the second identifier change detection unit 62_2 detects that the fourth identifier 14 received by the sending and receiving unit 61 is different from the second identifier 12 stored in the storage unit 63, and the first identifier 11 received by the sending and receiving unit 61 matches the first identifier 11 stored in the storage unit 63.

The identifier converting unit 62_3, when the change of the first identifier 11 is detected by the first identifier change detection unit 62_1, converts the third identifier 13 received by the sending and receiving unit 61 into the first identifier 11. Then, the converted first identifier 11 and the second identifier 12 are output to the management unit 62_4. Further, the identifier converting unit 62_3, when the second identifier change detection unit 62_2 detects the change of the second identifier 12, converts the fourth identifier 14 received by the sending and receiving unit 61 into the second identifier 12. Then, the first identifier 11 and the converted second identifier 12 are output to the device management unit 62_4.

The device management unit 62_4 manages the device 1 that sent the third identifier 13 and second identifier 12 as the device 1 that has the first identifier 11 and second identifier 12 output from the identifier converting unit 62_3. Further, the device management unit 62_4 manages the device 1 that sent the first identifier 11 and the fourth identifier 14 as the device 1 having the first identifier 11 and the second identifier 12 output from the identifier converting unit 62_3.

<Operation of Device Management System A>

Next, the operation of the device management system A in Embodiment 1 will be described.

Initially, the device 1 sends the first identifier 11 of the device 1 stored in the first storage unit 1_2 and the second identifier 12 stored in the second storage unit 1_3 to the cloud server 2. The cloud server 2 stores the first identifier 11 and the second identifier 12 sent from the device 1 to the database 52 of the storage unit 63.

The device 1, when the first identifier 11 stored in the first storage unit 1_2 of the device 1 is changed to the third identifier 13, the device-side sending and receiving unit 1_4 sends the third identifier 13 and the second identifier 12 to the cloud server 2.

Further, when the second identifier 12 stored in the first storage unit 1_2 of the device 1 is changed to the fourth identifier 14, the device-side sending and receiving unit 1_4 sends the first identifier 11 and the fourth identifier 14 to the cloud server 2.

Figure 5:
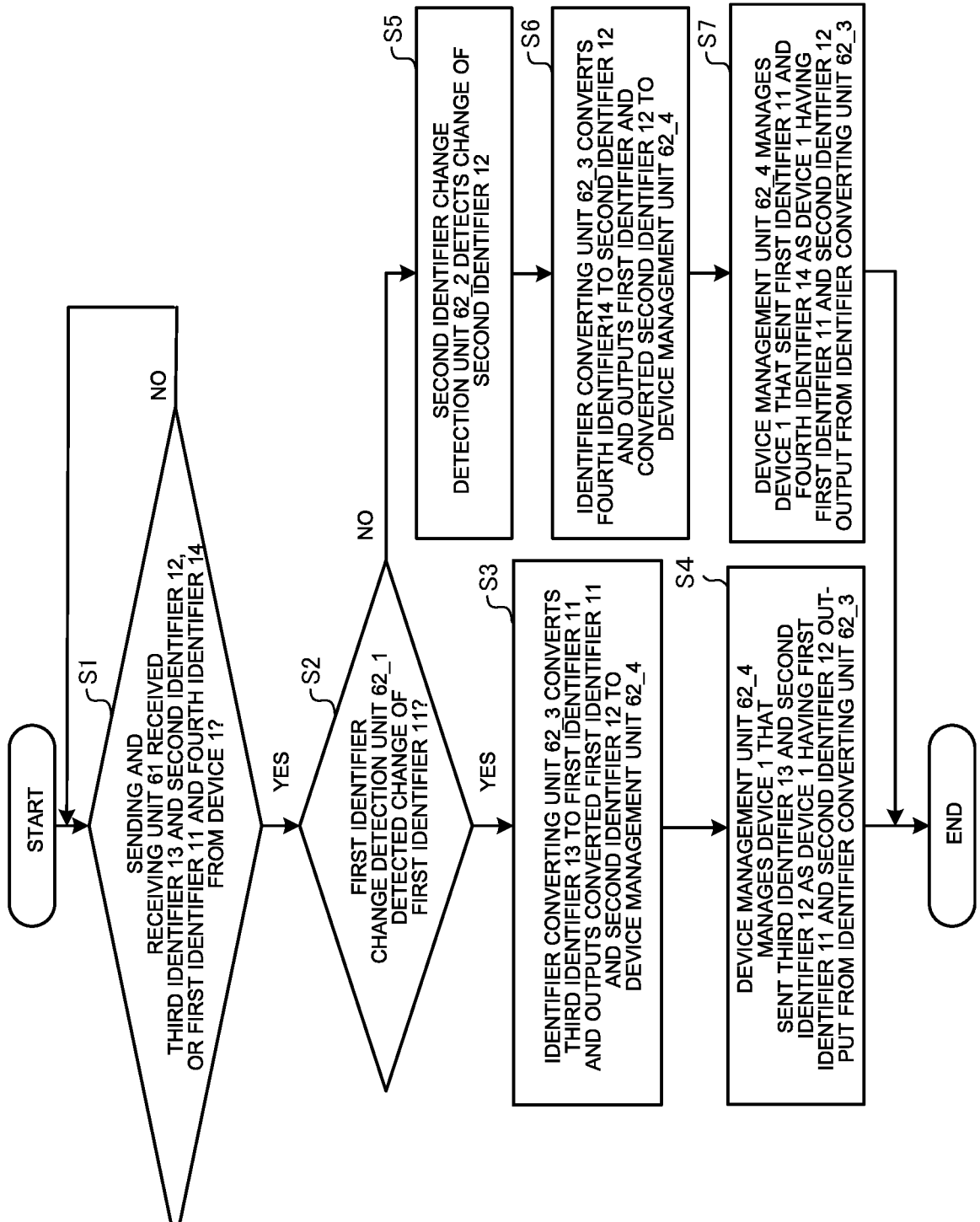
FIG. 5 is a flowchart for describing the operation of the cloud server of the device management system according to Embodiment 1.

FIG. 5 is a flowchart for describing the operation of the cloud server 2 of the device management system A in Embodiment 1.

The sending and receiving unit 61 of the cloud server 2 determines whether the third identifier 13 and the second identifier 12 are received from the device 1, or the first identifier 11 and fourth identifier 14 are received from the device 1 (step S1).

In step S1, when the sending and receiving unit 61 has not received the third identifier 13 and second identifier 12, or the sending and receiving unit 61 has not received the first identifier 11 and the fourth identifier 14 (NO in step S1), the process of step S1 is continued.

In step S1, when the sending and receiving unit 61 receives the third identifier 13 and second identifier 12 (YES in step S1), it is determined whether the first identifier change detection unit 62_1 detected the change of the first identifier 11 (step S2). Further, in step S1, when it is determined that the sending and receiving unit 61 received the first identifier 11 and the fourth identifier 14 (YES in step S1), it is determined whether the first identifier change detection unit 62_1 detected the change of the first identifier 11 (step S2).

In step S2, when it is determined that the first identifier change detection unit 62_1 detected the change of the first identifier 11 (YES in step S2), the identifier converting unit 62_3 converts the third identifier 13 into the first identifier 11. Then, the identifier converting unit 62_3 outputs the converted first identifier 11 and the second identifier 12 to the device management unit 62_4 (step S3).

Next, the device management unit 62_4 receives the first identifier 11 and the second identifier 12 output by the identifier converting unit 62_3. The device management unit 62_4 manages the device 1 that sent the third identifier 13 and the second identifier 12 as a device 1 having the first identifier 11 and the second identifier 12 output from the identifier converting unit 62_3 (step S4).

In step S2, when the first identifier change detection unit 62_1 does not detect the change of the first identifier 11 (NO in step S2), the second identifier change detection unit 62_2 detects the change of the second identifier 12 (step S5).

In step S5, when the second identifier change detection unit 62_2 detects a change of the second identifier 12, the identifier converting unit 62_3, converts the fourth identifier 14 to the second identifier 12. Then, the identifier converting unit 62_3 outputs the first identifier 11 and the converted second identifier 12 to the device management unit 62_4 (step S6).

Next, the device management unit 62_4 manages the device 1 that sent the first identifier 11 and the fourth identifier 14 as a device 1 having the first identifier 11 and the second identifier 12 output from the identifier converting unit 62_3 (step S7).

Figure 6:
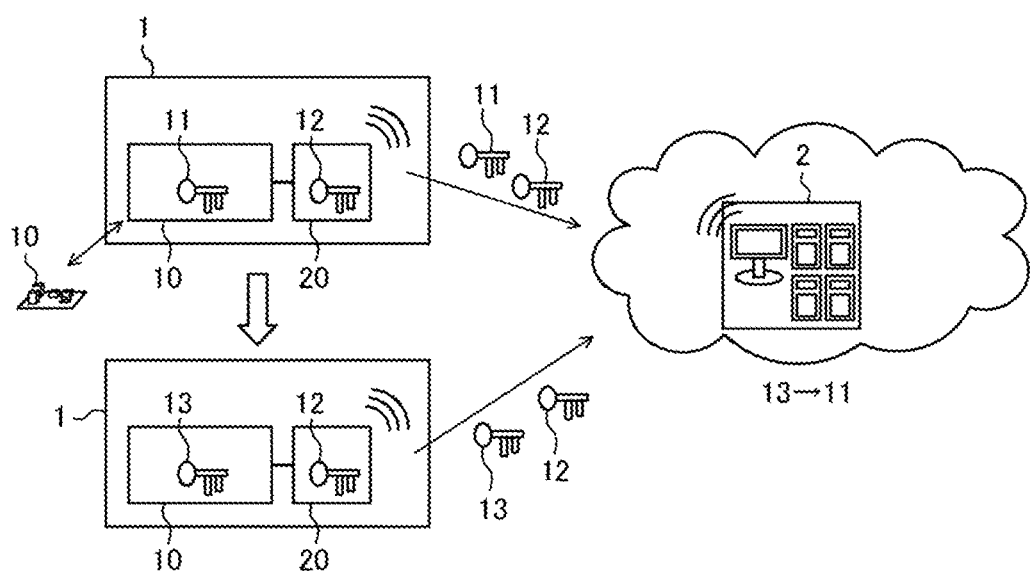
FIG. 6 is a diagram for describing a case where a first identifier of a control board of a device in the device management system according to Embodiment 1 is changed to a third identifier.

FIG. 6 is a diagram for describing the case where the first identifier 11 of the control board 10 of the device 1 of the management system A in Embodiment 1 is changed to the third identifier 13.

As shown in FIG. 6, the configuration of the control board 10 of the device 1 is changed and the first identifier 11 of the control board 10 is changed to the third identifier 13. The device 1 sends the third identifier 13 and the second identifier 12 to the cloud server 2. The cloud server 2, when detecting that the first identifier 11 of the device 1 is changed, converts the third identifier 13 to the first identifier 11. Then, the cloud server manages device 1 in which the first identifier 11 is changed to the third identifier 13 as the device 1 having the first identifier 11 and the second identifier 12.

In the description for FIG. 6, when the second identifier 12 is changed, the management process of the device 1 is performed with the first identifier 11 being read as the second identifier 12, the second identifier 12 being read as the first identifier 11, and the third identifier 13 being read as the fourth identifier 14.

<Modification>

In the device management system A in Embodiment 1, a configuration is described in which the cloud server 2 has the first identifier change detection unit 62_1 and the second identifier change detection unit 62_2.

However, the cloud server 2 may only include the first identifier change detection unit 62_1 or the second identifier change detection unit 62_2.

Figure 7:
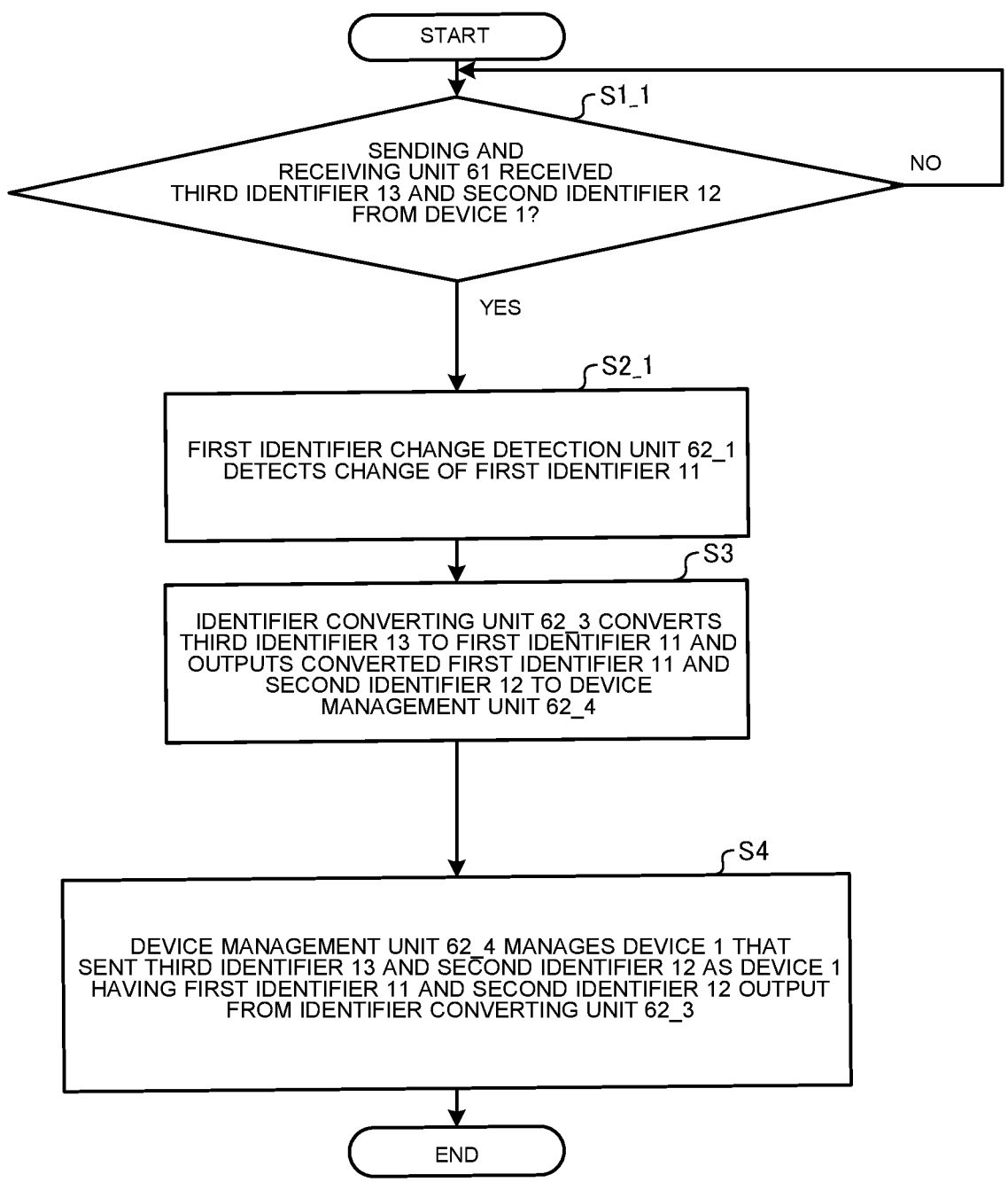
FIG. 7 is a flowchart for describing an operation of a modification the cloud server of the device management system according to Embodiment 1.

FIG. 7 is a flowchart for describing the operation of the modification of the cloud server 2 of the device management system A in Embodiment 1. Here, a configuration is described with focus being on a case where the cloud server 2 only includes the first identifier change detection unit 62_1. In FIG. 7 will be described with the focus on the differences from FIG. 5.

When only the second identifier change detection unit 62_2 is included, in FIG. 7, the first identifier change detection unit 62_1 is read as the second identifier change detection unit 62_2, and the first identifier 11 is read as second identifier 12. The second identifier 12 is read as the first identifier 11. The third identifier 13 is read as the fourth identifier 14.

As shown in FIG. 7, in step S1_1, it is determined that whether the third identifier 13 and second identifier 12 is received (step S1_1).

In step S1_1, when the sending and receiving unit 61 did not receive the third identifier 13 and second identifier 12 (No in step S1_1), the process of step S1_1 is continued.

In step S1_1, when the sending and receiving unit 61 did receive the third identifier 13 and second identifier 12 (YES in step S1_1), the first identifier change detection unit 62_1 detects a change of the first identifier 11 (step S2_1).

In step S2_1, when the first identifier change detection unit 62_1 detects the change of the first identifier 11, the identifier converting unit 62_3 converts the third identifier 13 to the first identifier 11. Then, the identifier converting unit 62_3 outputs the converted first identifier 11 and the second identifier 12 into the device management unit 62_4 (step S3).

<Advantageous Effect>

Next, advantageous effects of the device management system A in Embodiment 1 will be described.

According to the device management system A in Embodiment 1, the device management unit 62_4 manages the device 1 that sent the third identifier 13 and second identifier 12 as the device 1 having the first identifier 11 and the second identifier 12. Further, the device management unit 62_4 manages the device 1 that sent the first identifier 11 and the fourth identifier 14 as the device 1 having the first identifier 11 and the second identifier 12 output by the identifier converting unit 62_3. With this configuration, the device management system A can conduct management of the device 1 even when part of the configuration of the device 1 is changed due to repairing and replacement of the device 1, and it is possible to manage the device 1 as the device 1 substantially same as before change.

Further, according to the device management system A in Embodiment 1, it is possible to continuously manage the device 1 during the entire life of the device 1 in which it is installed, has failure, has repairing or replacement and is retired.

Embodiment 2

Next, a device management system according to Embodiment 2 will be described. The device 1 of the device management system A of the Embodiment 2, being similar to the Embodiment 1 of the device management system A, includes the control board 10 and the communication board 20 as shown in FIG. 1.

In the device management system A in Embodiment 2, the device 1 converts the third identifier 13 to the first identifier 11. Further, the device 1 converts the fourth identifier 14 to the second identifier 12. Further, the device 1 sends the first identifier 11 and the second identifier 12 to the cloud server 2.

Figure 8:
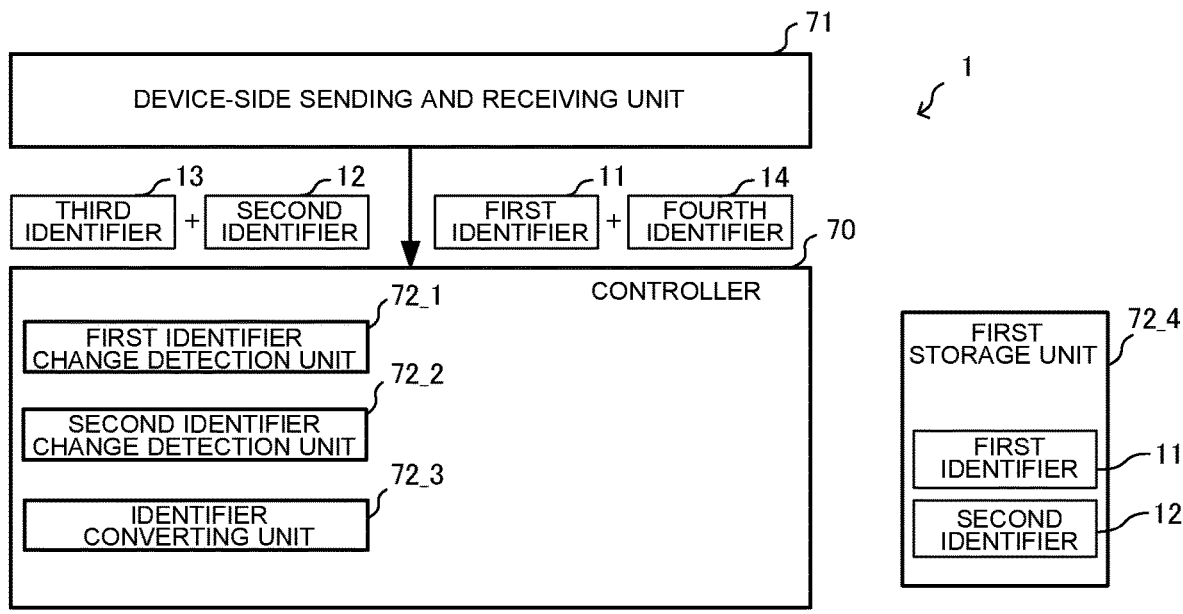
FIG. 8 is a functional block diagram of the device of the device management system according to Embodiment 2.

FIG. 8 is a functional block diagram of the device 1 of the device management system according to Embodiment 2. As shown in FIG. 8, the device 1 includes the controller 70, the device-side sending and receiving unit 71 and first storage unit 72_4. The controller 70 includes the first identifier change detection unit 72_1, the second identifier change detection unit 72_2 and the identifier converting unit 72_3.

In Embodiment 2, the controller 70, the device-side sending and receiving unit 71 and the first storage unit 72_4 are provided on the communication board 20 provided in the device 1, but they may be provided at any other portions of the device 1.

The first storage unit 72_4 stores the first identifier 11 and the second identifier 12.

The device-side sending and receiving unit 71 receives the third identifier 13 and second identifier 12 allocated when the configuration of device 1 is changed. Also, the device-side sending and receiving unit 71 receives the fourth identifier 14 changed from the first identifier 11 and the second identifier 12 and being for identifying the device 1 in communication between the device 1 and the cloud server 2.

The first identifier change detection unit 72_1 detects the change of the first identifier 11 when the device-side sending and receiving unit 71 receives the third identifier 13 from the device 1 in which the configuration is changed is different from the first identifier 11 stored in the first storage unit 72_4, and the second identifier 12 received by the device-side sending and receiving unit 71 matches the second identifier 12 stored in the first storage unit 72_4.

The second identifier change detection unit 72_2 detects the change of the second identifier 12 when the fourth identifier 14 received by the device-side sending and receiving unit 71 is different from the second identifier 12 stored in the first storage unit 72_4, and the first identifier 11 received by the device-side sending and receiving unit 71 matches first identifier 11 stored in the first storage unit 72_4.

The identifier converting unit 72_3, when the first identifier change detection unit 72_1 detects the change of the first identifier 11, converts the third identifier 13 received by the device-side sending and receiving unit 71 to the first identifier 11, outputs the converted first identifier 11 and the second identifier 12. Further, the identifier converting unit 72_3, when the second identifier change detection unit 72_2 detects the change of the second identifier 12, converts the fourth identifier 14 received by the device-side sending and receiving unit 71 to the second identifier 12, and outputs the first identifier 11 and the converted second identifier 12 to the device-side sending and receiving unit 71.

The device-side sending and receiving unit 71 sends the first identifier 11 and the second identifier 12 output by the identifier converting unit 72_3 to the cloud server 2.

Figure 9:
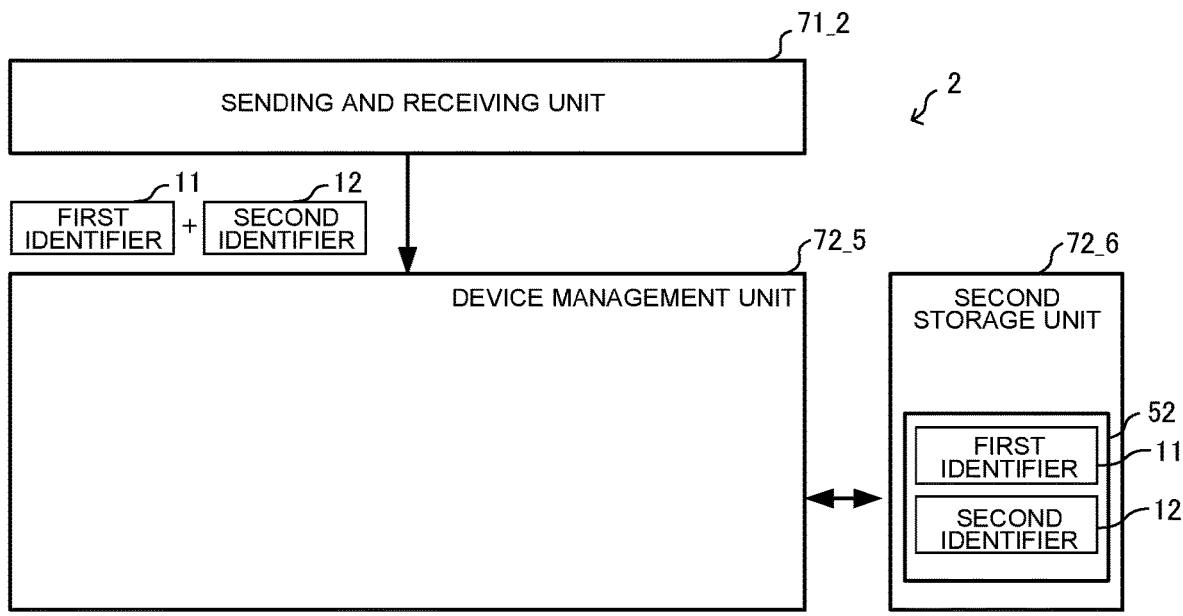
FIG. 9 is a functional block diagram of the cloud server of the device management system according to Embodiment 2.

FIG. 9 is a functional block diagram of the cloud server 2 of the device management system according to Embodiment 2. As shown in FIG. 9, the cloud server 2 includes a sending and receiving unit 71_2, a device management unit 72_5 and a second storage unit 72_6.

The sending and receiving unit 71_2 receives the first identifier 11 and the second identifier 12 sent from the device 1.

The second storage unit 72_6 stores the first identifier 11 and the second identifier 12 of the device 1 before change to the database 52.

The device management unit 72_5, when receiving the first identifier 11 and the second identifier 12 sent from the device-side sending and receiving unit 71 of device 1, manages the device 1 in which the first identifier 11 is changed as the device 1 having the first identifier 11 and the second identifier 12 stored in second the storage unit 72_6. The device management unit 72_5, when receiving the first identifier 11 and the second identifier 12 sent from the device-side sending and receiving unit 71 of the device 1, manages the device 1 in which the second identifier 12 is changed as the device 1 having the first identifier 11 and the second identifier 12 stored in the second storage unit 72_6.

<Operation of Device Management System A>

Next, the operation of the device management system A according to Embodiment 2 will be described.

Initially, the device 1 before the first identifier 11 and the second identifier 12 are changed, sends the first identifier 11 and the second identifier 12 of the device 1 stored in the first storage unit 72_4 to the cloud server 2. The cloud server 2 stores the first identifier 11 and the second identifier 12 sent from the device 1 to the database 52 of the second storage unit 72_6.

Figure 10:
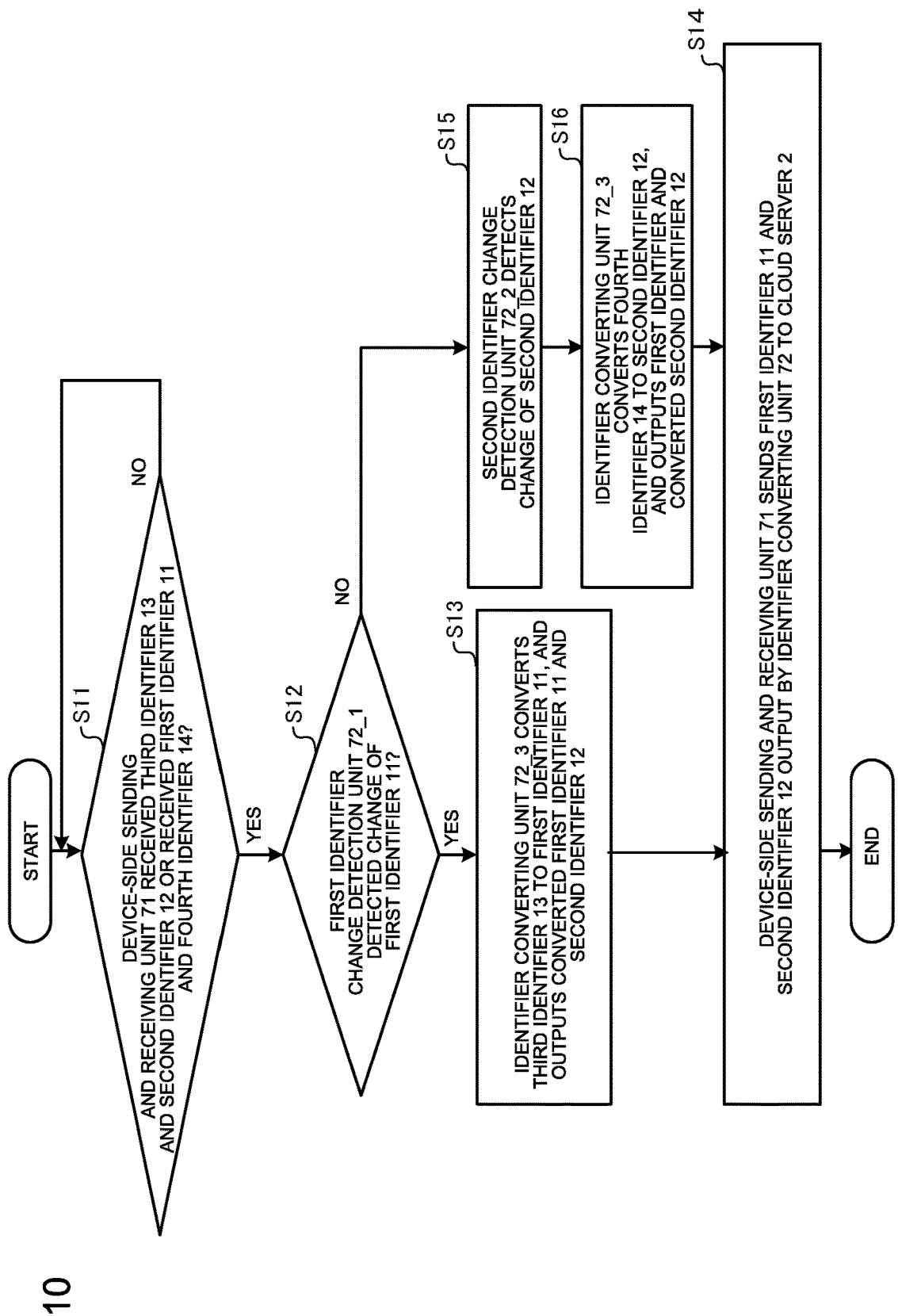
FIG. 10 is a flowchart for describing an operation of the device of the device management system according to Embodiment 2.

FIG. 10 is a flowchart for describing the operation of the device 1 of the device management system according to Embodiment 2.

The sending and receiving unit 71_2 determines whether the third identifier 13 and the second identifier 12 are received from the device-side sending and receiving unit 71 of the device 1, or the first identifier 11 and the fourth identifier 14 are received (step S11).

In step S11, when the sending and receiving unit 71_2 did not receive the third identifier 13 and second identifier 12, or when the sending and receiving unit 71_2 did not receive the first identifier 11 and fourth identifier 14 (NO in step S11), continues the process of step S11.

In step S11, when the device-side sending and receiving unit 71 receives the third identifier 13 and the second identifier 12 (YES in step S11), determines whether the first identifier change detection unit 72_1 detected the change of the first identifier 11 (step S12).

In step S12, when it is determined the first identifier change detection unit 72_1 detected the change of the first identifier 11 (YES in step S12), the identifier converting unit 72_3 converts the third identifier 13 to the first identifier 11. Then, the identifier converting unit 72_3 outputs the converted first identifier 11 and the second identifier 12 (step S13).

Next, the device-side sending and receiving unit 71 sends the first identifier 11 and the second identifier 12 output by the identifier converting unit 72_3 to the cloud server 2 (step S14).

In step S12, when it is determined that the first identifier change detection unit 72_1 did not detect the change of the first identifier 11 (NO in step S12), the second identifier change detection unit 72_2 detects the change of the second identifier 12 (step S15).

In step S15, when the second identifier change detection unit 72_2 detected the change of the second identifier 12, the identifier converting unit 72_3 converts the fourth identifier 14 to the second identifier 12. Then, the identifier converting unit 72_3 outputs the first identifier 11 and the converted second identifier 12 (step S16). After that, the process goes back to step S14.

Figure 11:
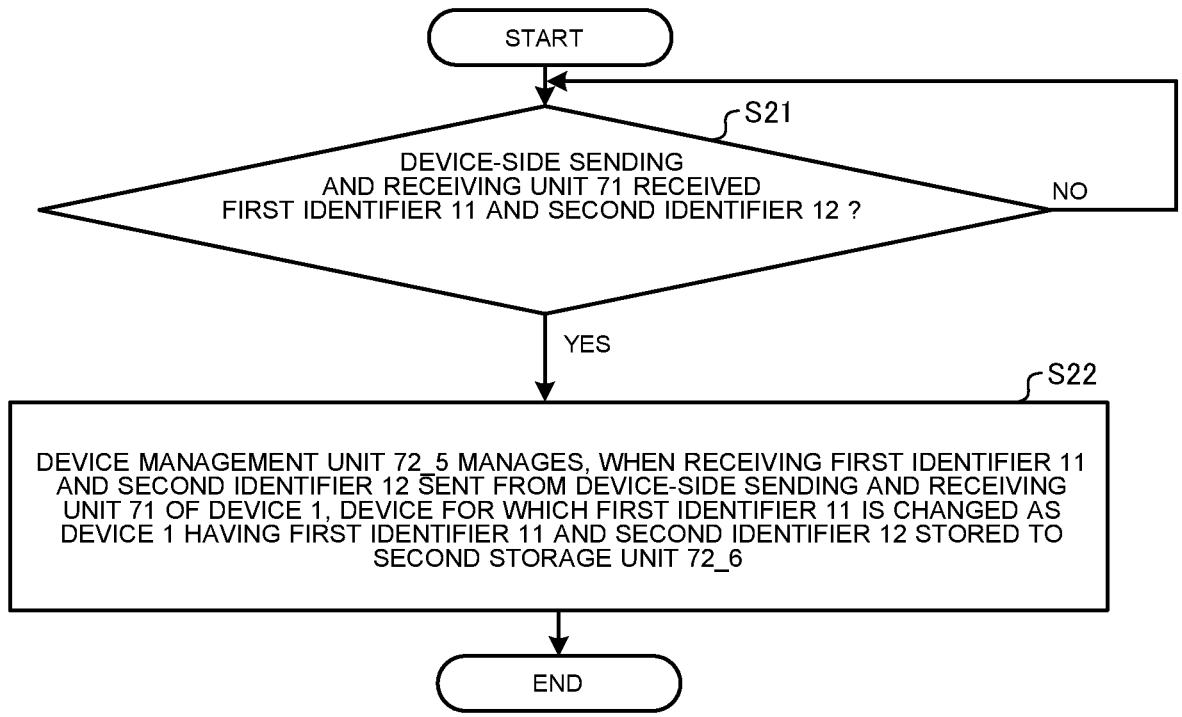
FIG. 11 is a flowchart for describing the operation of the cloud server of the device management system according to Embodiment 2.

FIG. 11 is a flowchart for describing the operation of the cloud server 2 of the device management system A in Embodiment 2.

As shown in FIG. 11, it is determined whether the sending and receiving unit 71_2 received the first identifier 11 and the second identifier 12 from the device 1 (step S21).

In step S21, when it is determined that the sending and receiving unit 71_2 did not receive the first identifier 11 and second identifier 12 from the device 1 (NO in step S21), the process of step S21 is continued.

In step S21, when the sending and receiving unit 71_2 has received the first identifier 11 and the second identifier 12 from the device 1 (YES in step S21), the device management unit 72_5 manages the device 1 in which the first identifier 11 is changed as the device 1 having the first identifier 11 and the second identifier 12 stored in the second storage unit 72_6 (step S22).

Figure 12:
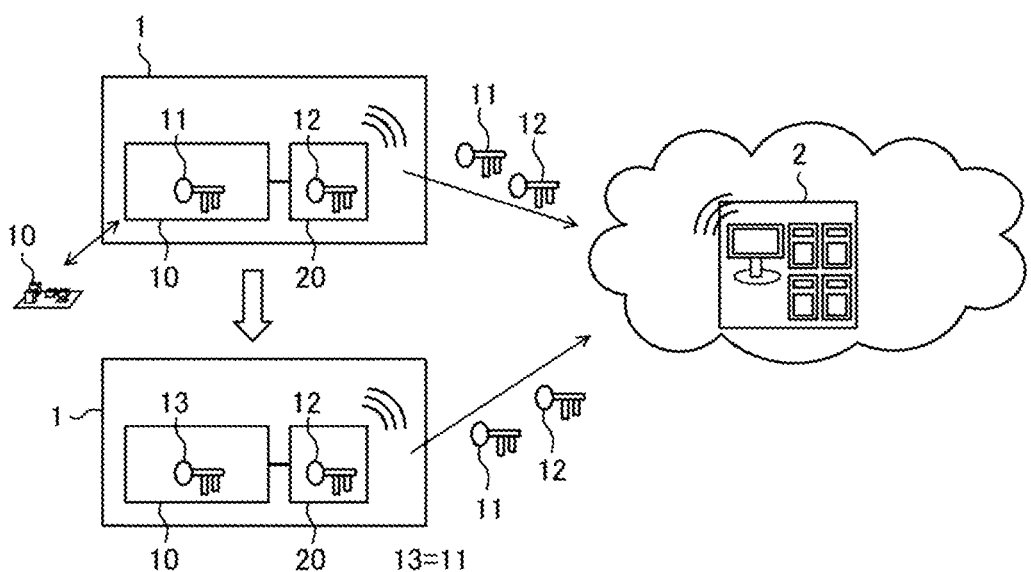
FIG. 12 is a diagram for describing a case where a first identifier of a control board of the device of the device management system according to Embodiment 2 is changed to a third identifier.

FIG. 12 is a diagram for describing a case where the first identifier 11 of the control board 10 of the device 1 of the management system A in Embodiment 2 is changed to the third identifier 13.

As shown in FIG. 12, when the configuration of device 1 is changed, the first identifier 11 of the control board 10 of the device 1 is converted to the third identifier 13. The first identifier of the change detection unit 72_1 of the controller 70 of the device 1, when detecting the change of the first storage unit 72_4 based on the second identifier 12, converts the third identifier 13 to the first identifier 11. Then, the device-side sending and receiving unit 71 of the device 1 sends the converted first identifier 11 and the second identifier 12 to the cloud server 2. The cloud server 2 manages device 1 in which the first identifier 11 is changed in the same way as the device 1 having the first identifier 11 and the second identifier 12.

In the description for FIG. 12, when the second identifier 12 is changed, the first identifier 11 is read as the second identifier 12, the second identifier 12 is read as the first identifier 11, and the third identifier 13 is read as the fourth identifier 14, and the management process of the device 1 is performed.

<Modification>

For the device management system A in Embodiment 2, a case is described in which the device 1 including the first identifier change detection unit 72_1 and the second identifier change detection unit 72_2.

However, the device 1 may only include either of the first identifier change detection unit 72_1 or the second identifier change detection unit 72_2.

Figure 13:
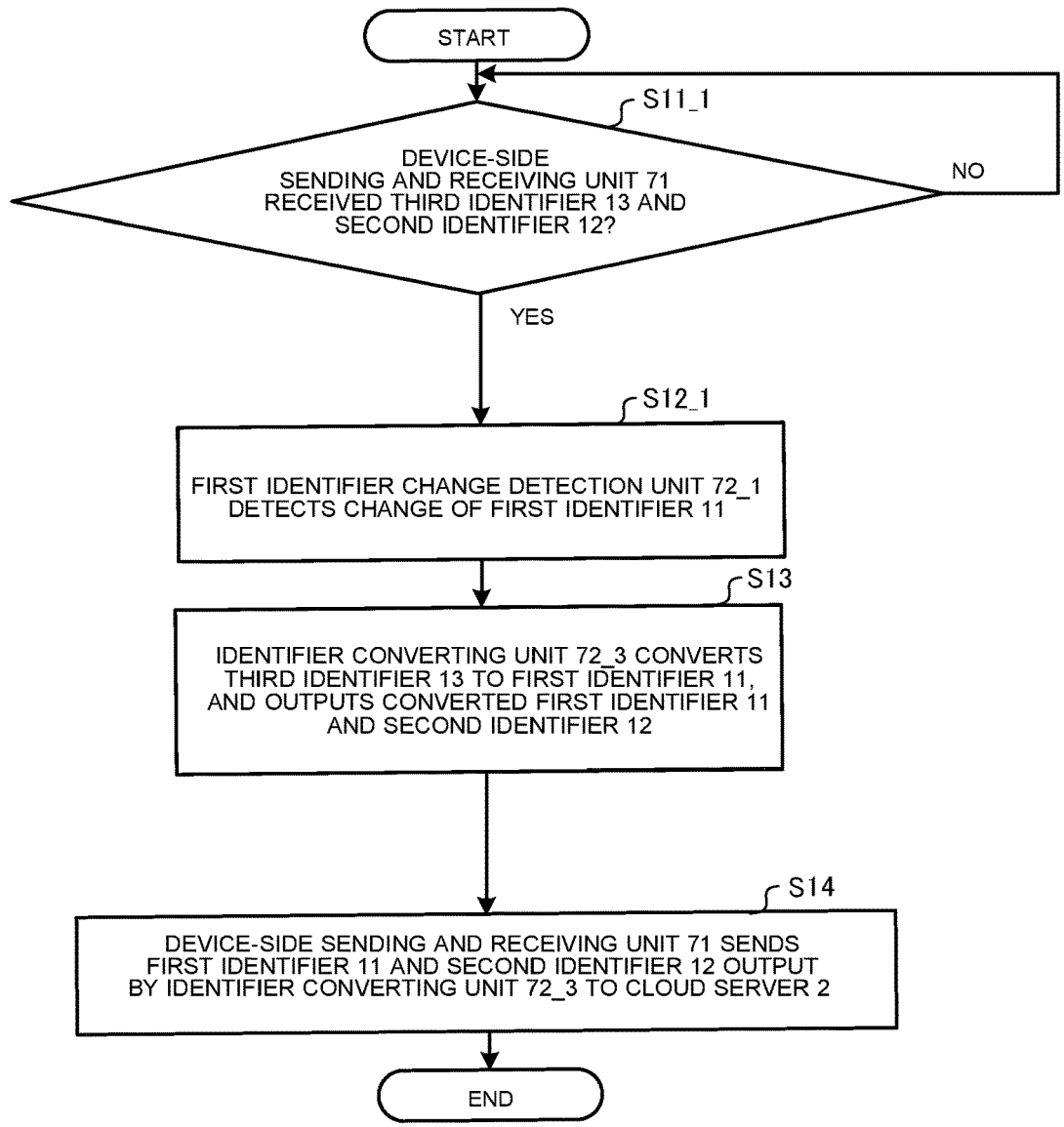
FIG. 13 is a flowchart for describing the operation of modification of the device of the device management system according to Embodiment 2.

FIG. 13 is a flowchart for describing the operation of the modification of the device 1 of the device management system according to Embodiment 2. Here, a case is described in which the device 1 only includes the first identifier change detection unit 72_1. Further, in FIG. 13, the description is given with focus on the difference from FIG. 10.

As shown in FIG. 13, in step S11_1, when the third identifier 13 and the second identifier 12 are receive (YES in step S11_1), the first identifier change detection unit 62_1 detects the change of the first identifier 11 (step S12_1). In step S11_1, when the third identifier 13 and the second identifier 12 are not received (No in step S11_1), process of step S11_1 will be continued.

In step S12_1, when the first identifier change detection unit 62_1 detects the change of the first identifier 11, the identifier converting unit 62_3 converts the third identifier 13 to the first identifier 11. Then, the identifier converting unit 62_3 outputs the converted first identifier 11 and the second identifier 12 to the device management unit 62_4 (step S13).

Advantageous Effect

Next, the advantageous effect of the device management system according to Embodiment 2 will be described.

According to the device management system according to Embodiment 2, the device 1 converts the third identifier 13 to the first identifier 11, or converts the fourth identifier 14 to the second identifier 12. Accordingly, compared to the device management system A in Embodiment 1, the load of converting process of the identifier in the cloud server 2 and the operating cost of the cloud server 2 can be lightened.

Embodiment 3

Figure 14:
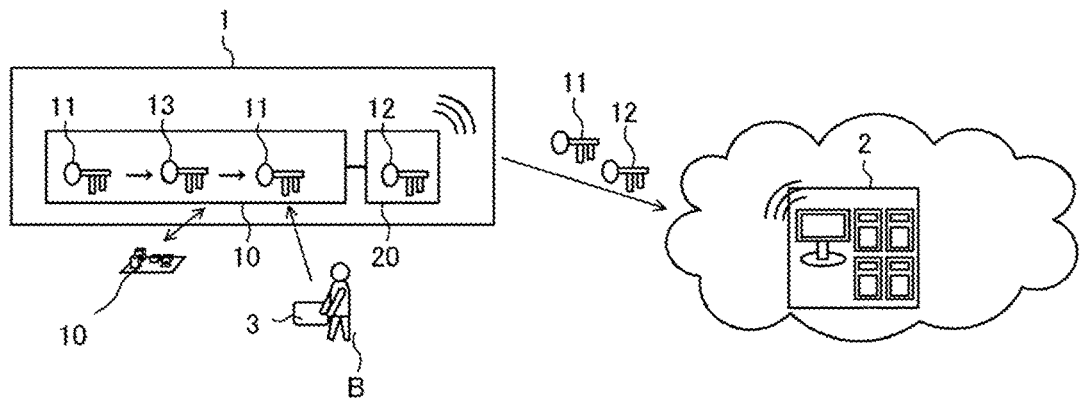
FIG. 14 is a diagram for describing a case where a third identifier stored in the control board of the device management system according to Embodiment 3 is rewritten into the first identifier.

Next, a device management system according to Embodiment 3 will be described. FIG. 14 is a diagram for describing a case where the third identifier 13 stored in the control board 10 of the device management system according to Embodiment 3 is rewritten into the first identifier 11.

In the device management system A in Embodiment 3, in addition to the device management system A in Embodiment 1 and device management system A in Embodiment 2, converting of the third identifier 13 or the fourth identifier 14 can be conducted by the first information processing unit 3 used by a repair worker.

In FIG. 14, the configuration of the control board 10 of the device 1 is changed, and the first identifier 11 of the control board 10 is changed to the third identifier 13. The repair worker B rewrites the third identifier 13 stored in the control board 10 of the device 1 rewritten into the first identifier 11.

Preferably, this rewrite is conducted before the third identifier 13 and second identifier 12 are sent to the cloud server 2. Moreover, the description is given of the case where the first information processing unit 3 rewrites the third identifier 13 to the first identifier 11. However, the first information processing unit 3 may rewrite the fourth identifier 14 to the second identifier 12.

When the functional block of the device 1 is as shown in FIG. 2, the first information processing unit 3 rewrites the third identifier 13 stored in the first storage unit 1_2 being a device-side storage unit the first identifier 11. Further, the first information processing unit 3 may rewrite the fourth identifier 14 stored in the second storage unit 1_3.

The device-side sending and receiving unit 1_4 sends the first identifier 11 rewritten by the first information processing unit 3 and the second identifier 12 stored in the second storage unit 1_3 to the cloud server 2.

In the cloud server 2, as the device 1 having the first identifier 11 and the second identifier 12, device 1 in which the first identifier 11 or the second identifier 12 is changed is managed.

In the above description, a case is described in which the first identifier 11 or the second identifier 12 is rewritten in the configuration of the device 1 in Embodiment 1. However, such a configuration can also be applied to the configuration of device 1 in Embodiment 2.

Figure 15:
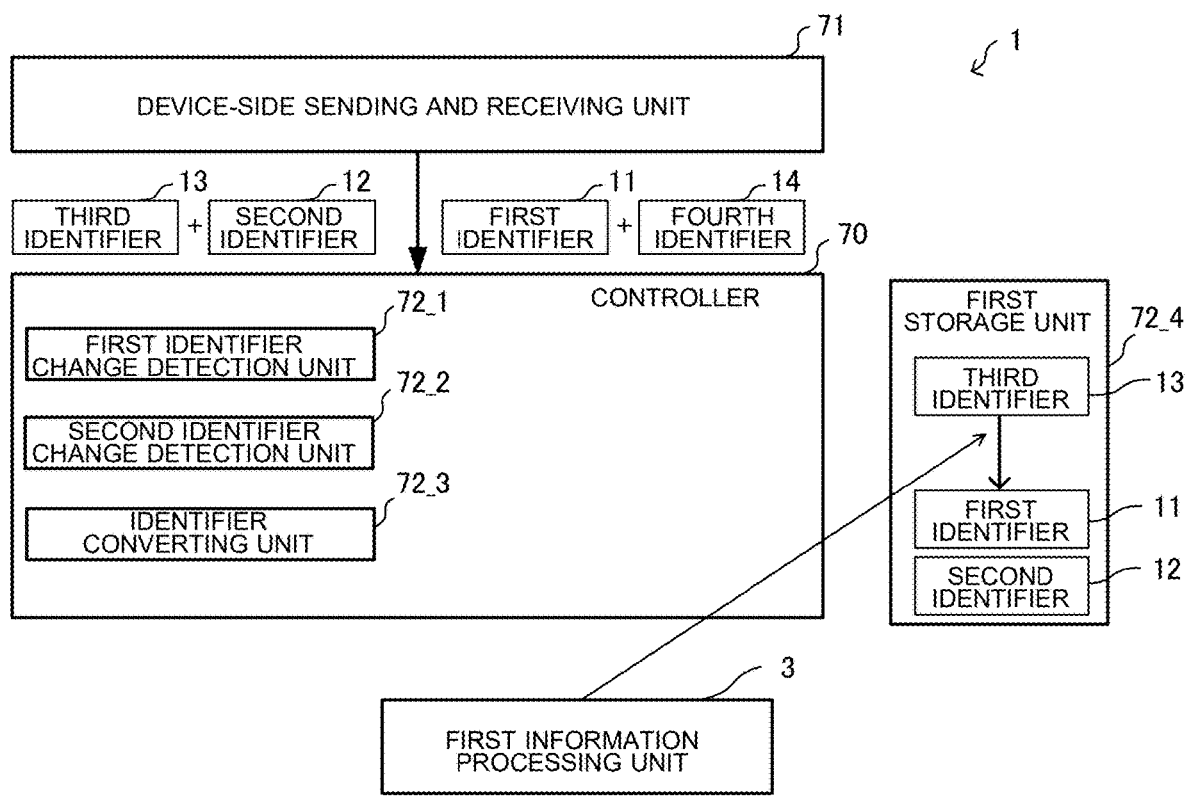
FIG. 15 is a diagram for describing rewrite of the third identifier by a first information processing unit of the device management system according to Embodiment 3.

When the functional block of the device 1 is as shown in FIG. 8 in Embodiment 2, the first information processing unit 3 rewrites the third identifier 13 stored in the first storage unit 72_4 being the device-side storage unit to the first identifier 11. FIG. 15 is a diagram for describing the rewriting of the third identifier 13 by the first information processing unit 3 in the device management system according to Embodiment 3.

Advantageous Effect

According to the device management system A according to Embodiment 3, the first information processing unit 3 rewrites the third identifier 13 to the first identifier 11, so it is optional that the cloud server 2 conducts the converting process of the third identifier 13.

Also when both the first identifier 11 and the second identifier 12 are changed, the first identifier 11 and the second identifier 12 can be rewritten by the first information processing unit 3, so the device 1 can be optimally managed.

Embodiment 4

Next, a device management system according to Embodiment 4 will be described. The device management system A in Embodiment 4 detects a specific operation against the device 1 after repair or replacement of the device 1. Then, the device 1, after the specific operation is detected, sends repair information of the device to the cloud server 2. The cloud server 2 associates the repair information of the device 1 with the first identifier 11 and the second identifier 12 and manages the repair information of the device 1.

Figure 16:
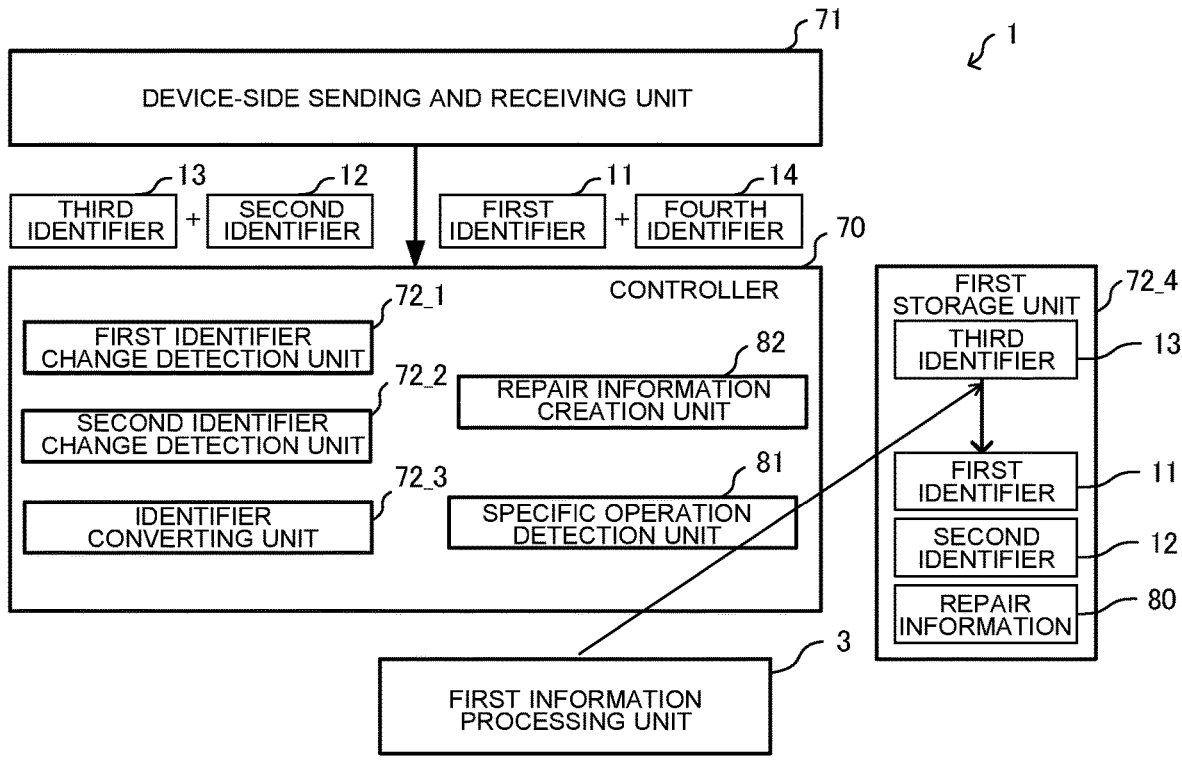
FIG. 16 is a functional block diagram of the device of the device management system according to Embodiment 4.

FIG. 16 is a functional block diagram of the device 1 of the device management system according to Embodiment 4. Same reference signs are attached to the portions same as those of FIG. 15, and the descriptions therefor are omitted.

As shown in FIG. 16, the controller 70 of the device 1 includes a specific operation detection unit 81 and a repair information creation unit 82.

The specific operation detection unit 81 detects a specific operation against the device 1. Here, specific operation is performed after completion of the repair or replacement of the device 1. The specific operation is, for example, pressing a test operation button for ten times consecutively during the operation of the device 1.

The specific operation detection unit 81 is provided at the device 1, but may be provided at the first information processing unit 3, and the first information processing unit 3 may detect the specific operation and notify the device 1 of it.

The repair information creation unit 82, when the specific operation detection unit 81 detected the specific operation, creates repair information 80 indicating that the repair or replacement of the device 1 has been conducted and stores the created repair information 80 is in the first storage unit 72_4.

The repair information 80 is information stored in associated with the first identifier 11 and the second identifier 12. The repair information 80 includes information indicating completion of repair or replacement of the device 1. Repairing of the device 1 include repair or replacement of a part the device 1. Further, the repair information 80 includes information relating to repairing of the device 1, for example, the part of the device 1 where the repair or replacement is conducted, information relating to the abnormality, owner information, user information, sensor information, information relating to the replacement part for the next repairing and information indicating timing for the replacement of the part.

The device-side sending and receiving unit 71 sends repair information 80 created by the repair information creation unit 82 to the cloud server 2.

Figure 17:
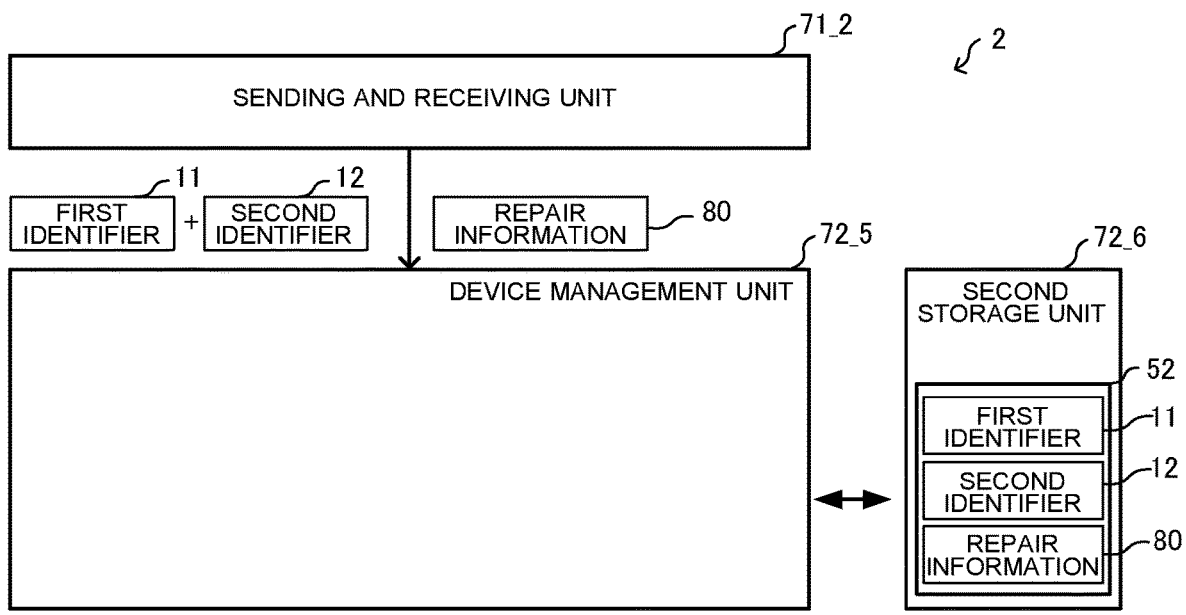
FIG. 17 is a functional block diagram of the cloud server of the device management system in Embodiment 4.

FIG. 17 is a functional block diagram of the cloud server 2 of the device management system according to Embodiment 4. Same reference signs are attached to the pats same as FIG. 9, and the descriptions therefor are omitted.

The sending and receiving unit 71_2 receives the repair information 80 sent from the device 1.

The device management unit 72_5 of the cloud server 2, as shown in FIG. 17, associates the repair information 80 sent from the sending and receiving unit 71_2 with the first identifier 11 and the second identifier 12 and stores them in the second storage unit 72_6 and manage them.

Figure 18:
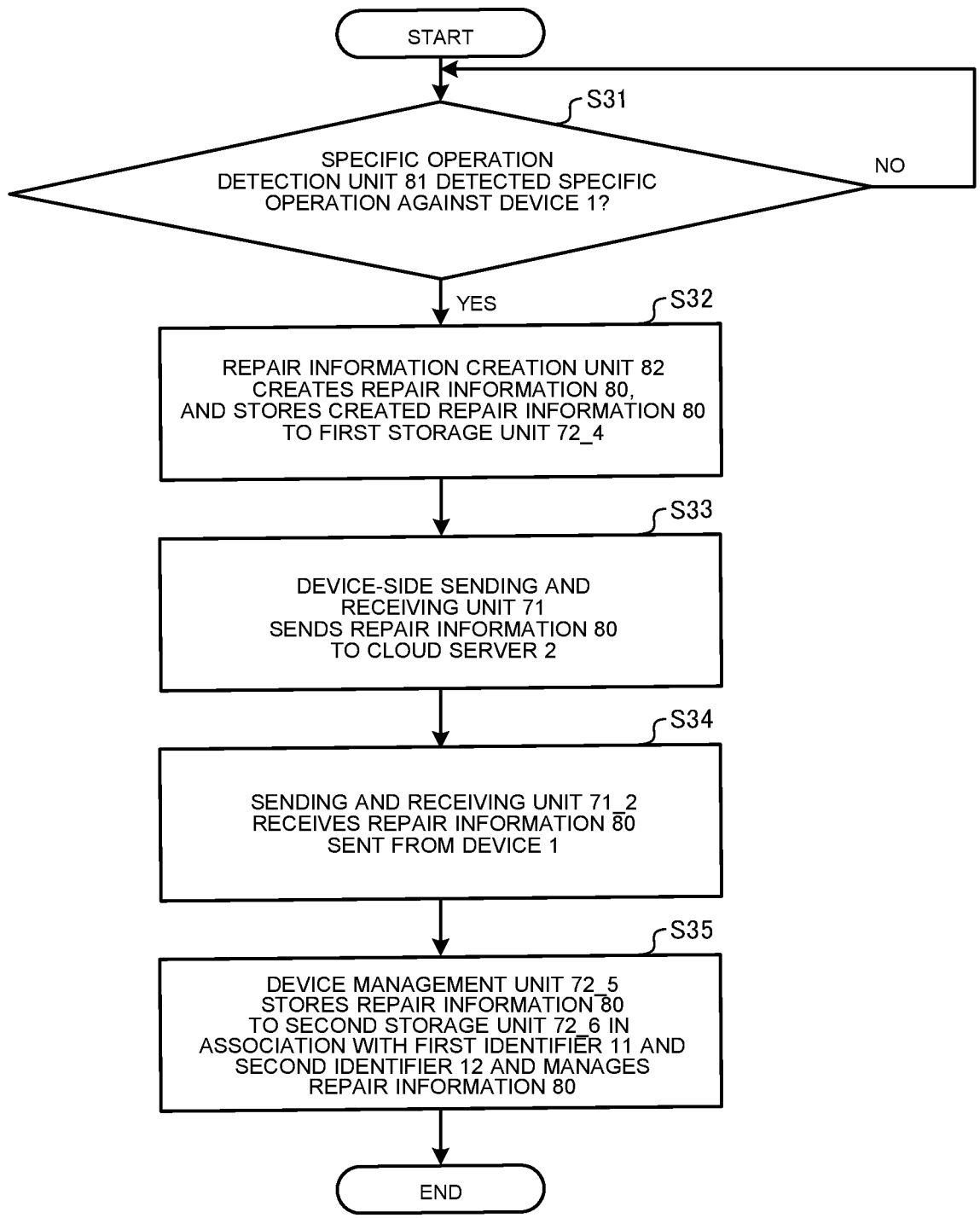
FIG. 18 is a flowchart for describing an operation of the device and the cloud server of the device management system according to Embodiment 4.

FIG. 18 is a flowchart of the device 1 and the cloud server 2 for describing the operation of the device management system according to Embodiment 4. The process operation of the first identifier 11 and the second identifier 12 is same as FIG. 10. Here, the process operation of the repair information 80 is described.

It is determined whether the specific operation detection unit 81 detected the specific operation against the device 1 (step S31).

In step S31, when it is determined that the specific operation detection unit 81 did not detect the specific operation against the device 1 (NO in step S31), the determination process of step S31 is continued.

When it is determined that the specific operation detection unit 81 detected the specific operation against the device 1 (YES in step S31), the repair information creation unit 82 creates the repair information 80, and stores the created repair information 80 in the first storage unit 72_4 (step S32). Next, the device-side sending and receiving unit 71 sends the repair information to the cloud server 2 (step S33).

The sending and receiving unit 71_2 of the cloud server 2 receives the repair information 80 sent from the device 1 (step S34).

The device management unit 72_5 associates the repair information 80 with the first identifier 11 and the second identifier 12 and stores the repair information 80 to the second storage unit 72_6 and manages the repair information 80 (step S35).

Advantageous Effect

According to the device management system A according to Embodiment 4, the cloud server 2 manages the repair information 80 in association with the first identifier 11 and the second identifier 12. Therefore, it is possible to conduct optimal management of the device 1 in the form of including the repair information 80.

Embodiment 5

Next, a device management system according to Embodiment 5 will be described.

Figure 19:
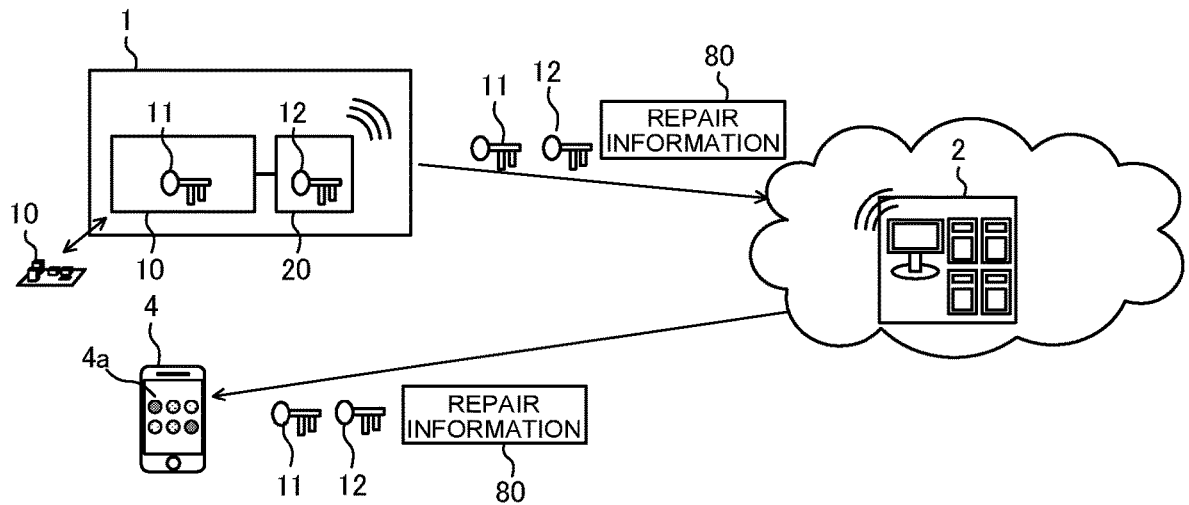
FIG. 19 is a diagram for describing the device management system according to Embodiment 5.

FIG. 19 is a diagram for describing the device management system according to Embodiment 5. In the device management system according to Embodiment 5, the cloud server 2 sends the first identifier 11, the second identifier 12 and the repair information 80 sent from the device 1 to the second information processing unit 4. The second information processing unit 4 includes a display unit 4a. The second information processing unit 4 displays the first identifier 11, the second identifier 12 and the repair information 80 sent from the cloud server 2 on the display unit 4a.

As shown in FIG. 17, the cloud server 2 stores, in the second storage unit 72_6, the first identifier 11, the second identifier 12, and the repair information 80.

Between the cloud server 2 and the second information processing unit 4, communication is performed by using the public wireless network or the short-range wireless communication. The communication using the public wireless network is, Long Term Evolution (LTE) communication or 5th Generation (5G) communication. The short-range wireless communication is Wi-Fi or Bluetooth (registered trademark).

The second information processing unit 4 may speak aloud, with a voice, the first identifier 11, the second identifier 12 and the repair information 80 displayed on the display unit 4a.

Figure 20:
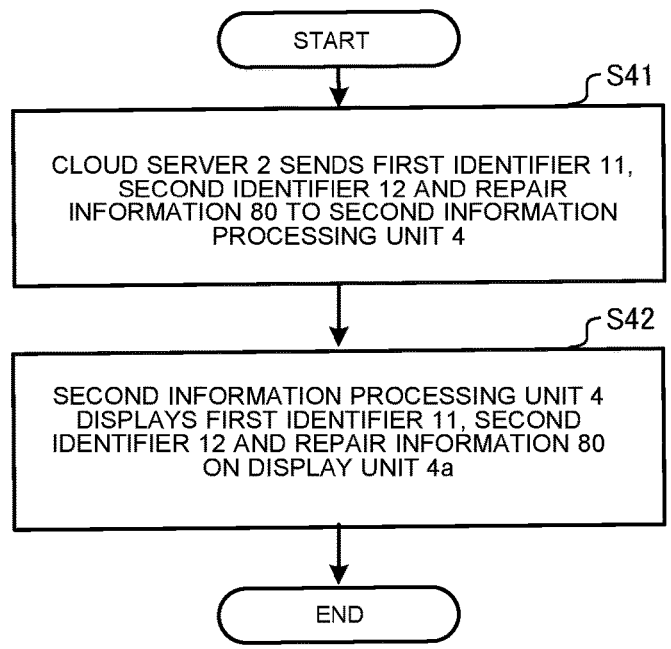
FIG. 20 is a flowchart for describing the operation of the device management system according to Embodiment 5.

FIG. 20 is a flowchart for describing the operation of the device management system according to Embodiment 5.

As shown in FIG. 20, the cloud server 2 sends the first identifier 11, the second identifier 12 and the repair information 80 to the second information processing unit 4 (step S41).

Next, the second information processing unit 4 displays the first identifier 11, the second identifier 12 and the repair information 80 on the display unit 4a (step S42).

Figure 21:
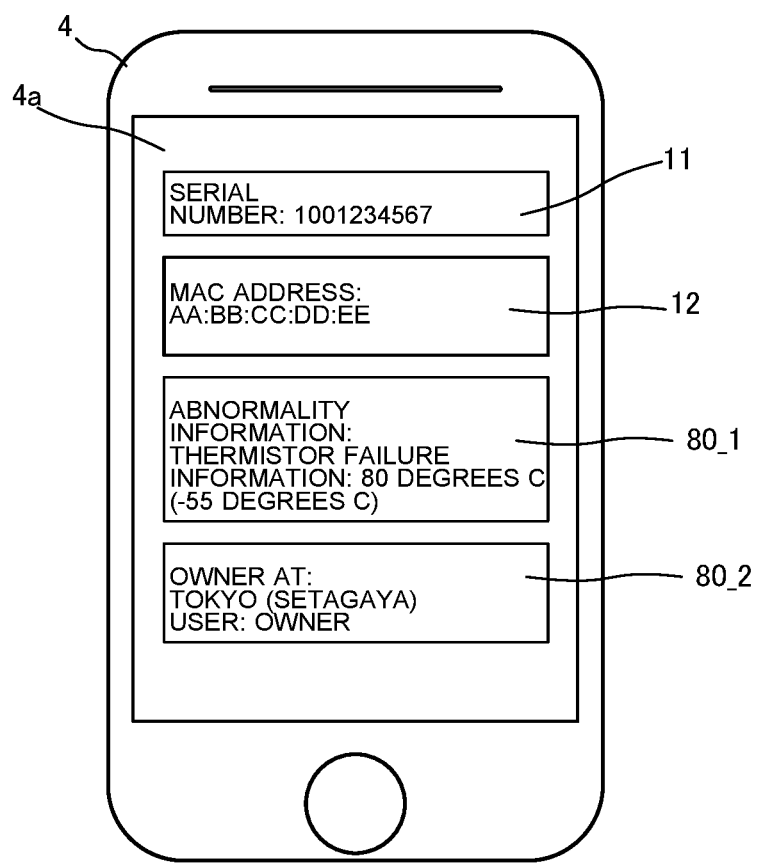
FIG. 21 is a diagram showing an example of information displayed on the display unit of the second information processing unit of the device management system of Embodiment 5.

FIG. 21 shows an example of the information displayed on the display unit 4a of the second information processing unit 4 of the device management system according to Embodiment 5.

As shown in FIG. 21, on the display unit 4a of the second information processing unit 4, the first identifier 11 showing the manufacturer's serial number, the second identifier 12 showing MAC address, repair information 80_1 showing abnormality information and repair information 80_2 showing owner information and user information, are displayed.

Figure 22:
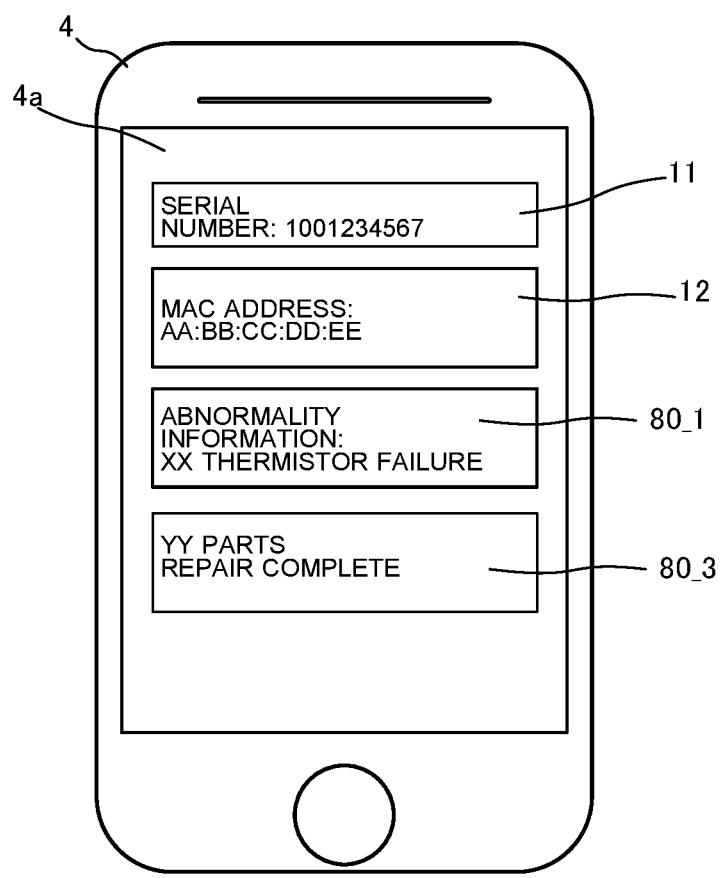
FIG. 22 is a diagram showing an other example of the information displayed on the display unit of the second information processing unit of the device management system of Embodiment 5.

FIG. 22 is a diagram showing another example of the information displayed on the display unit 4a of the second information processing unit 4 of the device management system A in Embodiment 5.

As shown in FIG. 22, on the display unit 4a of the second information processing unit 4, the first identifier 11 showing the manufacturer's serial number, the second identifier 12 showing MAC address, the repair information 80_1 showing abnormality information and repair information 80_3 showing completion of replacement of the part are displayed.

Figure 23:
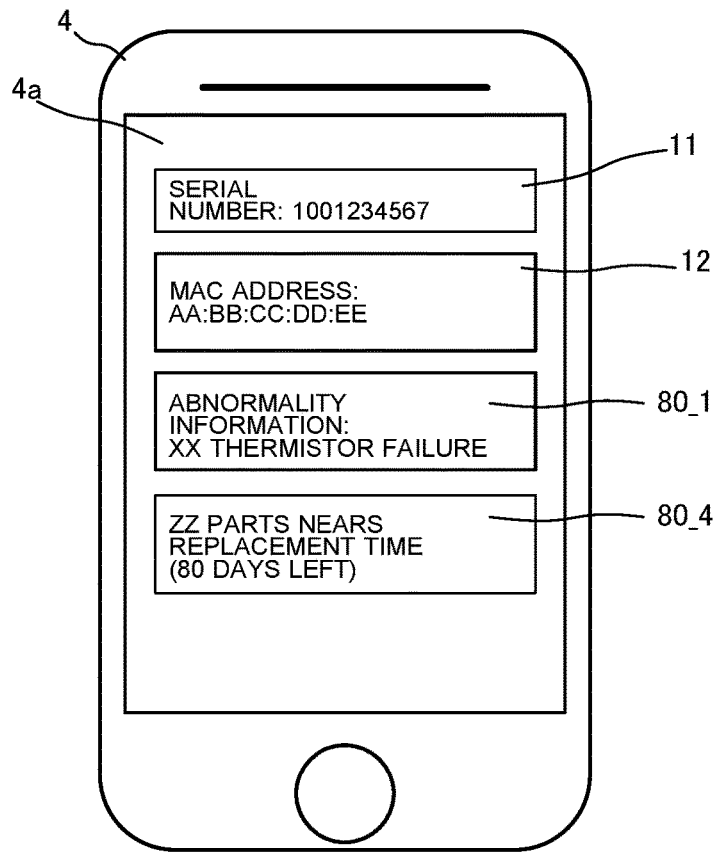
FIG. 23 is diagram showing an other example of the information displayed on the display unit of the second information processing unit of the device management system according to Embodiment 5.

FIG. 23 is drawing showing other example of the information displayed on the display unit 4a of the second information processing unit 4 of the device management system A according to Embodiment 5.

As shown in FIG. 23, on the display unit 4a of the second information processing unit 4, the first identifier 11 representing the manufacturer's serial number, the second identifier 12 representing MAC address, the repair information 80_1 representing abnormality information and repair information 80_4 indicating that part replacement is necessary.

In Embodiment 5, like in Embodiment 2, a case is described where the identifier conversion is conducted on the device 1. However, the configuration can be applied to a case where identifier conversion is conducted in the cloud server 2 as in Embodiment 1.

Advantageous Effect

According to the device management system A according to Embodiment 5, the second information processing unit 4 displays the first identifier 11, the second identifier 12, and the repair information 80 on the device 1. Therefore, the user can accurately manage the device 1.

Embodiment 6

Next, a device management system according to Embodiment 6 will be described.

Figure 24:
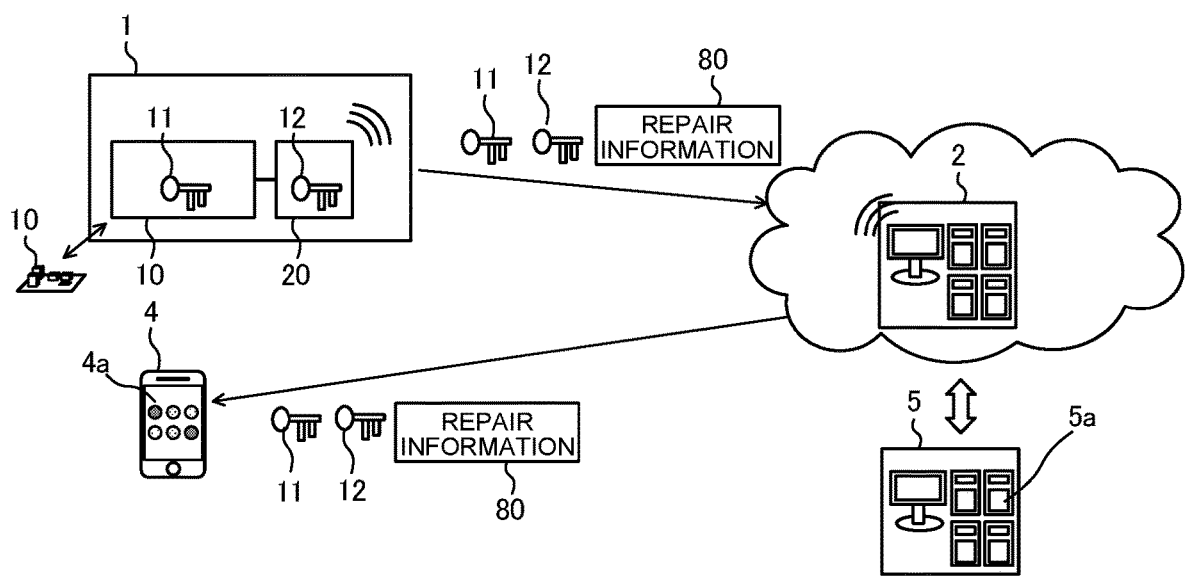
FIG. 24 is a diagram for describing the device management system according to Embodiment 6.

FIG. 24 is a diagram for describing the device management system according to Embodiment 6.

In the device management system A in Embodiment 6, the cloud server 2 is connected to the maintenance server 5. The cloud server 2 predicts life of the replacement part of the device 1. The maintenance server 5 conducts management of the inventory data 5a of the replacement part based on the life of the replacement part predicted by the cloud server 2.

Figure 25:
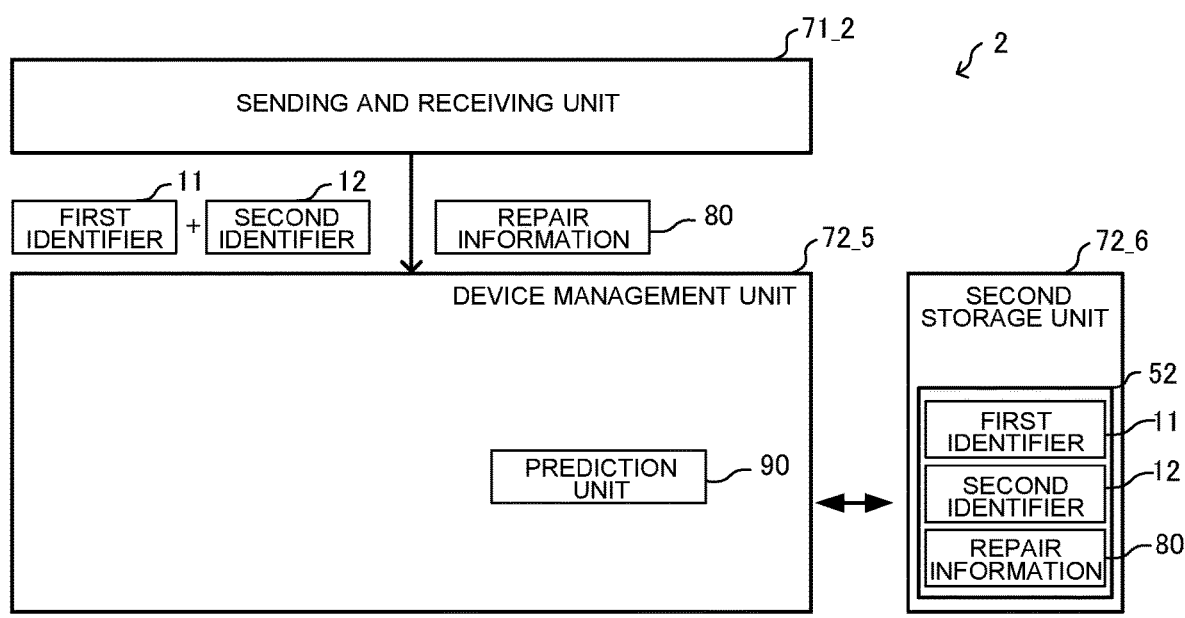
FIG. 25 is a functional block diagram of the cloud server of the device management system according to Embodiment 6.

FIG. 25 is a functional block diagram of the cloud server 2 of the device management system according to Embodiment 6. Same reference signs are attached to the part same as FIG. 17, and the descriptions therefor are omitted.

The prediction unit 90 predicts life of the replacement part of the device 1 based on the repair information 80. Specifically, based on the information related to the replacement part of the device 1 included in the repair information 80 and with reference to the rated service life of the replacement part of the device 1, the prediction unit 90 predicts life of the replacement part of the device 1. The method of prediction of the replacement part by the prediction unit 90 of the device 1 is not limited to the above.

Further, the prediction unit 90 may, based on the repair information 80, predict timing of the next repair or replacement of the device 1, or predict failure of the device 1 or the remaining life of the device 1. Any method of prediction for any target can be applied.

The sending and receiving unit 71_2 sends life of the replacement part of the device 1 predicted by the prediction unit 90 to the maintenance server 5.

The maintenance server 5, as shown in FIG. 24, has inventory data 5a. The maintenance server 5, based on the life of the replacement part of the device 1 predicted by the prediction unit 90, manages inventory data 5a of the replacement part. Specifically, the maintenance server 5 manages the inventory data 5a to sort the replacement part in the ascending order of life of the replacement part.

Figure 26:
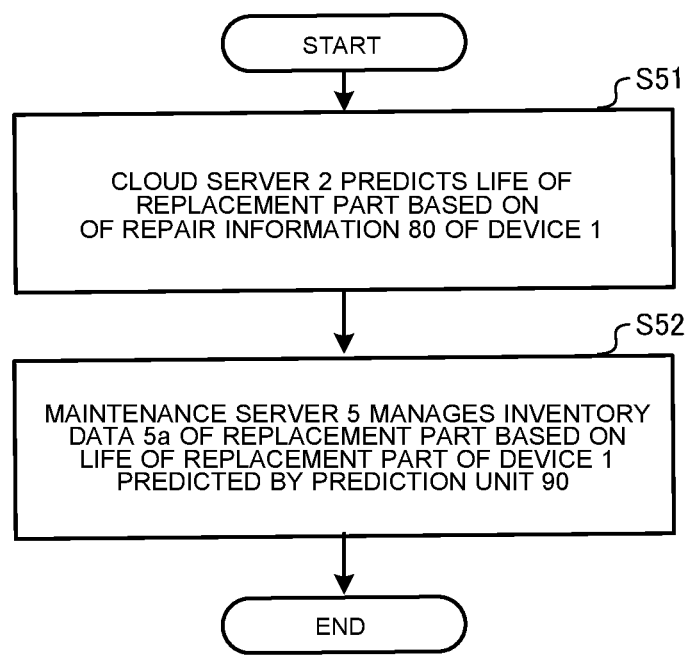
FIG. 26 is a flowchart for describing the operation of the device management system according to Embodiment 6.

FIG. 26 is a flowchart for describing the operation of the device management system according to Embodiment 6.

As shown in FIG. 26, the cloud server 2 predicts life of the replacement part the device 1 based on the repair information 80 (step S51).

Next, the maintenance server 5 manages inventory data 5a of the replacement part of the device 1 based on the life predicted by the prediction unit 90 (step S52).

Advantageous Effect

According to the device management system A according to Embodiment 6, the maintenance server 5 manages inventory data 5a of the replacement part based on the life of the replacement part of the device 1. Therefore, the time period from ordering of the replacement part by the repair service representative and obtaining the replacement part to start repairing work can be reduced, increasing the quality of service in management of the device 1.

Further, since it is possible to reduce unnecessary part and replacement part of low usage frequency, maintenance cost, such as for storage, can be reduced.

The embodiments are merely examples, and do not limit the scope of the claims. The embodiments can be implemented in various ways other than those described above. Within the gist of the embodiment, various omissions, replacement, substitution and changes are possible. These embodiments and their modifications are included in the scope and the gist of the embodiments.

REFERENCE SIGNS LIST

1: device, 1_1, 70: controller, 1_2: first storage unit, 1_3: second storage unit, 1_4: device-side sending and receiving unit, 2: cloud server (device management apparatus), 3: first information processing unit, 4: second information processing unit, 4a: display unit, 5: maintenance server, 5a: inventory data, 10: control board, 11: first identifier, 12: second identifier, 13: third identifier, 14: fourth identifier, 20: communication board, 41: bus, 42: CPU, 43: memory, 44: sending and receiving device, 45: storage device, 51: OS, 52: data base, 53: device management program, 61, 71_2: sending and receiving unit, 62: management unit, 71: device-side sending and receiving unit, 62_1, 72_1: first identifier change detection unit, 62_2, 72_2: second identifier change detection unit, 62_3, 72_3: identifier converting unit, 62_4: device management unit, 63: storage unit, 72_4: first storage unit, 72_5: device management unit, 72_6: second storage unit, 80, 80_1, 80_2, 80_3, 80_4: repair information, 81: specific operation detection unit, 82: repair information creation unit, 90: prediction unit, A: device management system, N: network, S: storage unit, B: repair worker.

The invention claimed is:

1. A device management system comprising:
an air-conditioning apparatus being a management target; and
a server configured to manage the air-conditioning apparatus,
the air-conditioning apparatus including
an air-conditioning-apparatus-side sending and receiving circuit configured to communicate with the server,
the server including
storage configured to store a first identifier unique to the air-conditioning apparatus and a second identifier different from the first identifier and uniquely identifying the air-conditioning apparatus in communication between the air-conditioning apparatus and the server; and
a server-controller configured to
receive, when a configuration of the air-conditioning apparatus is changed, both (i) a third identifier allocated by being changed from the first identifier and (ii) the second identifier, from the air-conditioning-apparatus-side sending and receiving circuit,
detect change of the first identifier responsive to an occurrence that both (i) the third identifier received from the air-conditioning-apparatus-side sending and receiving circuit is different from the first identifier stored in the storage and (ii) the second identifier received from the air-conditioning-apparatus-side sending and receiving circuit matches the second identifier stored in the storage,
responsive to the change of the first identifier being detected, convert the third identifier which is received to the first identifier, and output the converted first identifier and the second identifier, and
control overall operation of the air-conditioning apparatus that sent the third identifier and the second identifier as being a repair or replacement of the air-conditioning apparatus that includes the first identifier and the second identifier.

2. The device management system of claim 1, wherein
the server-controller is configured to receive the first identifier and a fourth identifier from the air-conditioning-apparatus-side sending and receiving circuit, the fourth identifier being allocated by being changed from the second identifier that identifies the air-conditioning apparatus in communication between the air-conditioning apparatus and the server,
the server-controller is further configured to
detect the change of the second identifier responsive to an occurrence that both (i) the fourth identifier received by the server-controller is different from the second identifier stored in the storage, and (ii) the first identifier received by the server-controller matches the first identifier stored in the storage,
responsive to the change of the second identifier being detected, convert the fourth identifier received which is received to the second identifier, and output the first identifier and the converted second identifier, and
manage the air-conditioning apparatus that sent the first identifier and the fourth identifier as being the repair or replacement of the air-conditioning apparatus including the first identifier and the second identifier.

3. The device management system of claim 1, wherein
the air-conditioning apparatus includes
an air-conditioning-apparatus-controller configured to detect a specific operation against the air-conditioning apparatus, and
responsive to the specific operation being detected, create repair information indicating that repair or replacement of the air-conditioning apparatus is conducted,
wherein
the air-conditioning-apparatus-side sending and receiving circuit is configured to send the repair information which is created to the server, and
the server-controller is configured to manage the repair information sent from the air-conditioning-apparatus-side sending and receiving circuit by associating the repair information with the first identifier and the second identifier.

4. The device management system of claim 3, further comprising
a maintenance server connected to the server and being configured to manage inventory data of a replacement part of the air-conditioning apparatus,
the server-controller being further configured to predict a life of the replacement part based on the repair information of the air-conditioning apparatus,
the maintenance server being configured to manage the inventory data of the replacement part of the air-conditioning apparatus based on the life of the replacement part predicted by the server-controller,
wherein
the maintenance server is configured to manage the inventory data of the replacement part based on the life of the replacement part of the air-conditioning apparatus which is predicted.

5. The device management system of claim 3, wherein the specific operation is a predetermined operation that indicates the repair or replacement of the air-conditioning apparatus.

6. The device management system of claim 1, further comprising:
a portable processor including a display,
wherein
the server is configured to send via wireless communication the first identifier and the second identifier to the portable processor,
the portable processor is configured to receive via wireless communication the first identifier and the second identifier from the server, and display the received first identifier and the second identifier on the display.

7. The device management system of claim 6, wherein
the portable processor is configured to receive repair information via wireless communication from the server, and display the received repair information on the display.

8. The device management system of claim 1, wherein the server and the air-conditioning apparatus are configured to be connected wiredly/wirelessly via a network.

9. The device management system of claim 1, wherein the air-conditioning apparatus includes a control board that stores the first identifier or the third identifier, and a communication board that stores the second identifier.

10. The device management system of claim 1, wherein the first identifier indicates a manufacturer's serial number of the air-conditioning apparatus, and
the second identifier indicates a Media Access Control (MAC) address.

11. A device management system comprising:
an air-conditioning apparatus being a management target; and
a server configured to manage the air-conditioning apparatus, wherein
the air-conditioning apparatus includes
first storage configured to store a first identifier unique to the air-conditioning apparatus and a second identifier different from the first identifier and uniquely identifying the air-conditioning apparatus in communication between the air-conditioning apparatus and the server,
an air-conditioning-apparatus-side sending and receiving circuit configured to receive, when a configuration of the air-conditioning apparatus is changed, a third identifier allocated by being changed from the first identifier and the second identifier, and
a controller configured to
detect change of the first identifier responsive to an occurrence that both (i) the third identifier received by the air-conditioning-apparatus-side sending and receiving circuit is different from the first identifier stored in the first storage, and (ii) the second identifier received by the air-conditioning-apparatus-side sending and receiving circuit matches the second identifier stored in the first storage, and
responsive to the change of the first identifier being detected, convert the third identifier received by the air-conditioning-apparatus-side sending and receiving circuit to the first identifier and output the converted first identifier and the second identifier,
wherein
the air-conditioning-apparatus-side sending and receiving circuit is configured to send the converted first identifier and the second identifier which is output to the server,
the server includes
a server-side sending and receiving circuit configured to receive the first identifier and the second identifier sent from the air-conditioning-apparatus-side sending and receiving circuit, and
a server-controller configured to control overall operation of the air-conditioning apparatus that sent the third identifier and the second identifier as being a repair or replacement of the air-conditioning apparatus that includes the first identifier and the second identifier.

12. The device management system of claim 11,
further comprising a portable processor, wherein
the first storage is configured to store the third identifier and the second identifier, and
the portable processor is configured to rewrite the third identifier stored in the first storage to the first identifier,
the air-conditioning-apparatus-side sending and receiving circuit is configured to send the first identifier which is rewritten and the second identifier stored in the first storage to the server.

13. The device management system of claim 11, wherein the server and the air-conditioning apparatus are configured to be connected wiredly/wirelessly via a network.

14. The device management system of claim 11, wherein the air-conditioning apparatus includes a control board that stores the first identifier or the third identifier, and a communication board that stores the second identifier.

15. The device management system of claim 11, wherein
the first identifier indicates a manufacturer's serial number of the air-conditioning apparatus, and
the second identifier indicates a Media Access Control (MAC) address.

* * * * *